(12) United States Patent
Yoshida et al.

(10) Patent No.: US 12,037,053 B2
(45) Date of Patent: Jul. 16, 2024

(54) OPERATION DEVICE OF WORK VEHICLE

(71) Applicant: KUBOTA CORPORATION, Osaka (JP)

(72) Inventors: Tomohiro Yoshida, Sakai (JP); Masatoshi Watanabe, Sakai (JP); Susumu Oki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/009,354

(22) PCT Filed: Jun. 1, 2021

(86) PCT No.: PCT/JP2021/020883
§ 371 (c)(1),
(2) Date: Dec. 9, 2022

(87) PCT Pub. No.: WO2021/256251
PCT Pub. Date: Dec. 23, 2021

(65) Prior Publication Data
US 2023/0339556 A1 Oct. 26, 2023

(30) Foreign Application Priority Data
Jun. 17, 2020 (JP) .................................. 2020-104666
Nov. 25, 2020 (JP) .................................. 2020-195531

(51) Int. Cl.
*B62D 49/06* (2006.01)
*G05G 1/01* (2008.04)
(Continued)

(52) U.S. Cl.
CPC .......... *B62D 49/0692* (2013.01); *G05G 1/01* (2013.01); *G05G 1/04* (2013.01); *G05G 5/03* (2013.01); *G05G 2505/00* (2013.01)

(58) Field of Classification Search
CPC ... G05G 1/01; G05G 5/03; G05G 1/04; B62D 49/0692
See application file for complete search history.

(56) References Cited

U.S. PATENT DOCUMENTS 5,887,669 A * 3/1999 Ostler ...................... G05G 1/04
180/53.4
6,065,365 A * 5/2000 Ostler ...................... G05G 1/04
74/543
(Continued)

FOREIGN PATENT DOCUMENTS

EP        1 869 960 A1    12/2007
JP        S62146501 A *    6/1987
(Continued)

OTHER PUBLICATIONS

JP 2013052771 A machine translation from espacenet.com (Year: 2023).*
(Continued)

*Primary Examiner* — Amy R Weisberg
*Assistant Examiner* — Maxwell L Meshaka
(74) *Attorney, Agent, or Firm* — Keating & Bennett, LLP

(57) ABSTRACT

An operation device of a work vehicle includes a position lever to set a height of a work device, a sensitivity adjustment lever to adjust an up/down sensitivity of the work device, and an up/down lever to selectively change a working state and a non-working state, the working state being a state in which the work device is positioned at the height set by the position lever, the non-working state being a state in which the work device is positioned above the set height. The up/down lever is located rearward of the position lever and the sensitivity adjustment lever.

9 Claims, 16 Drawing Sheets

(51) Int. Cl.
  *G05G 1/04*  (2006.01)
  *G05G 5/03*  (2008.04)

(56) References Cited

U.S. PATENT DOCUMENTS

| | | | |
|---|---|---|---|
| 11,305,828 B2* | 4/2022 | Sera | G05G 1/08 |
| 11,314,274 B2* | 4/2022 | Kosaki | G05G 1/06 |
| 11,447,194 B2* | 9/2022 | Tottori | G05G 1/04 |
| 11,738,673 B2* | 8/2023 | Kosaki | B60N 2/797 |
| | | | 180/315 |
| 2018/0197385 A1* | 7/2018 | Jayaraman | G05G 9/047 |
| 2020/0180713 A1* | 6/2020 | Kosaki | B62D 49/0692 |
| 2020/0183441 A1* | 6/2020 | Kosaki | B60K 26/02 |
| 2020/0198712 A1* | 6/2020 | Tottori | G05G 1/04 |
| 2021/0197905 A1* | 7/2021 | Sera | B62D 49/0692 |
| 2023/0339556 A1* | 10/2023 | Yoshida | A01B 63/10 |

FOREIGN PATENT DOCUMENTS

| | | |
|---|---|---|
| JP | 9-74815 A | 3/1997 |
| JP | 2001-209449 A | 8/2001 |
| JP | 2005-185107 A | 7/2005 |
| JP | 2006-14638 A | 1/2006 |
| JP | 2012-158208 A | 8/2012 |
| JP | 2012-161264 A | 8/2012 |
| JP | 2013-52771 A | 3/2013 |
| JP | 2017-63686 A | 4/2017 |
| JP | 2019-196169 A | 11/2019 |
| WO | WO-2021256251 A1 * 12/2021 ......... B62D 49/0692 |

OTHER PUBLICATIONS

JP 2012158208 A machine translation from espacenet.com (Year: 2024).*

Official Communication issued in International Patent Application No. PCT/JP2021/020883, mailed on Aug. 24, 2021.

* cited by examiner

FIG. 16
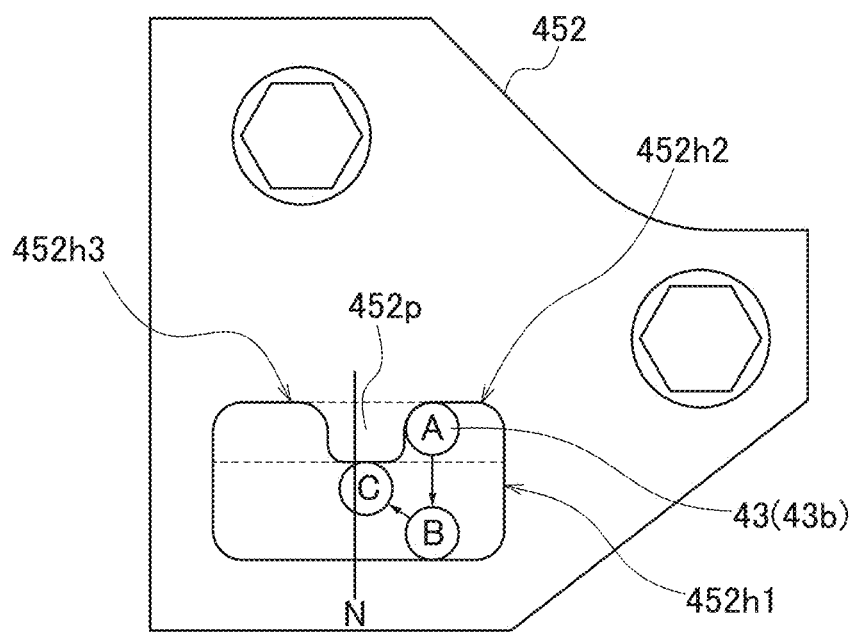
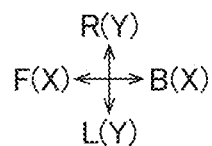

OPERATION DEVICE OF WORK VEHICLE

CROSS REFERENCE TO RELATED APPLICATIONS

This is a U.S. National Phase Application under 35 U.S.C. § 371 of International Patent Application No. PCT/JP2021/020883, filed Jun. 1, 2021, which claims priority to Japanese Patent Applications Nos. 2020-104666, filed Jun. 17, 2020 and 2020-195531, filed Nov. 25, 2020. The entire contents of each application are hereby incorporated by reference.

BACKGROUND OF THE INVENTION

1. Field of the Invention

The present invention relates to an operation device of a work vehicle provided with an up/down lever to selectively change a working state in which a work device is positioned at a control target height set by a position lever and a non-working state in which the work device is positioned above the control target height.

2. Description of the Related Art

JP 2005-185107 A discloses an operation device of a work vehicle provided with, as operation levers related to a work device (for example, a tilling device), a position lever for setting a control target height of the work device, a sensitivity adjustment lever for adjusting up/down sensitivity of the work device, and an up/down lever.

In order for a worker to change the working state and the non-working state by operating the position lever, an operation stroke of the position lever tends to be long, and it is usually troublesome for the worker. In addition, if movement between a working region and a non-working region is made many times, there is a possibility that a control target height cannot be equalized.

By operating the up/down lever, the worker selectively changes the working state, in which the work device is positioned at the control target height set by the position lever, and the non-working state, in which the work device is positioned above the control target height. When the work vehicle is to move from the working region in which work by the work device is carried out to the non-working region in which work by the work device is not carried out, the worker carries out changing to the non-working state by operating the up/down lever. On the other hand, after movement from the non-working region to the working region is made, the worker selectively changes the non-working state to the working state by operating the up/down lever. Even when movement between the working region and the non-working region is made many times, the worker can easily change the working state and the non-working state by operating the up/down lever.

SUMMARY OF THE INVENTION

The worker operates the work device by using the operation levers related to the work device while driving the work vehicle. Therefore, there has been room for improvement about operability of the operation levers related to the work device in consideration of driving of the work vehicle.

Preferred embodiments of the present invention provide operation devices of work vehicles each capable of improving operability of operation levers related to a work device, wherein the operation device is an operation device of the work vehicle provided with an up/down lever to selectively change a working state in which the work device is positioned at a control target height set by a position lever and a non-working state in which the work device is positioned above the control target height.

An operation device of a work vehicle according to an aspect of a preferred embodiment of the present invention includes a position lever to set a height of a work device, a sensitivity adjustment lever to adjust an up/down sensitivity of the work device, and an up/down lever to selectively change a working state and a non-working state, the working state being a state in which the work device is positioned at the height set by the position lever, the non-working state being a state in which the work device is positioned above the set height. The up/down lever is located rearward of the position lever and the sensitivity adjustment lever.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 16 is an explanatory diagram for describing movement of an operation device according to Modification Example 3.

Figure 1:
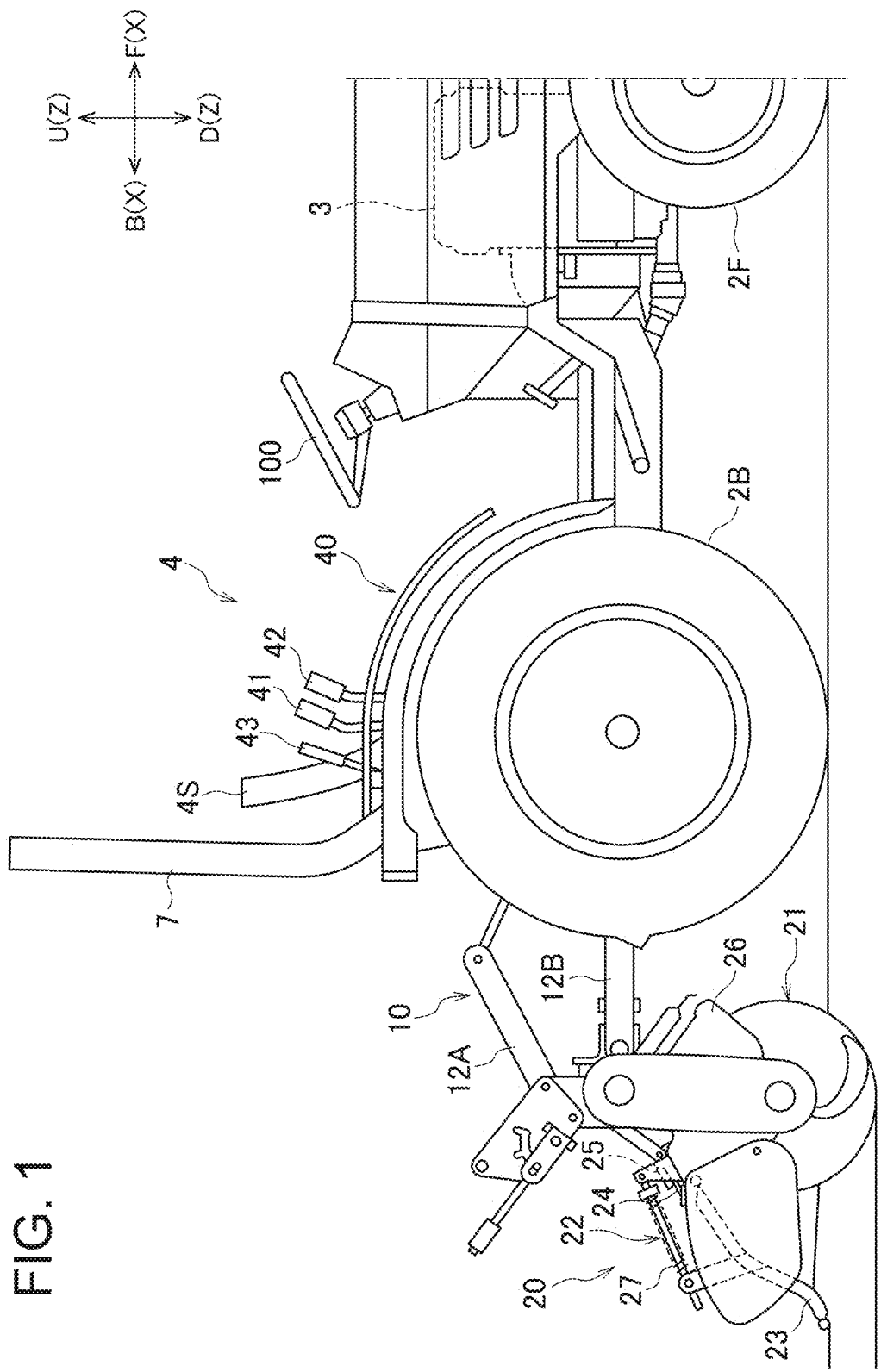
FIG. 1 is a right side view of a work vehicle according to a preferred embodiment of the present invention.

DETAILED DESCRIPTION OF THE
PREFERRED EMBODIMENTS

An operation device of a work vehicle according to an aspect of a preferred embodiment of the present invention includes a position lever to set a height of a work device, a sensitivity adjustment lever to adjust an up/down sensitivity of the work device, and an up/down lever to selectively change a working state and a non-working state, the working state being a state in which the work device is positioned at the height set by the position lever, the non-working state being a state in which the work device is positioned above the set height. The up/down lever is located rearward of the position lever and the sensitivity adjustment lever.

In many cases, a worker changes a state of a work device between a working state and a non-working state by an up/down lever while the worker actually visually checks the work device disposed in the rear side of a work vehicle to check the position of the work device. The up/down lever is located rearward of a position lever and a sensitivity adjustment lever. Therefore, compared with the case in which the up/down lever is disposed in front of the position lever and the sensitivity adjustment lever, during the checking of the position of the work device, the up/down lever is easily viewable, and gripping of a grip portion of the up/down lever is facilitated. By virtue of this, the worker is facilitated to operate the up/down lever in response to the actual position of the work device, and operability of the operation lever can be improved.

The up/down lever can be disposed in an inner side in a width direction of the work vehicle, the inner side being with respect to a rollover protective frame provided to protect a worker when the work vehicle rolls over. By virtue of this, even if the work vehicle rolls over, tilting of the up/down lever toward a driver seat can be restricted or prevented by a rollover protective frame.

An operation device of a work vehicle according to an aspect of a preferred embodiment of the present invention can further include a roller portion, and a contact that is relatively movable with respect to the roller portion while in contact with the roller portion. The working state and the non-working state can be mutually changed when the up/down lever moves in a front-rear direction of the work vehicle. The roller portion or the contact can move in the front-rear direction in response to the movement of the up/down lever in the front-rear direction. One of the roller portion and the contact can be biased toward the other one of the roller portion and the contact. The contact may include a contact surface to move the roller portion in a vertical direction of the work vehicle while relatively moving the roller portion with respect to the contact in the front-rear direction. Since one of a roller portion and a contact is biased toward the other one, the roller portion relatively moves with respect to the contact in a front-rear direction while the roller portion resists the force, which applies a biasing force when the roller portion is moved in the direction away from the contact among vertical directions. Therefore, the worker has to apply a force to the up/down lever in order to move the roller portion in the front-rear direction. Even if the worker unintentionally hits the up/down lever, the changing to the working state or the non-working state does not easily occur.

The contact surface may include a projecting portion that projects toward the roller portion in the vertical direction, and portions on both sides of the projecting portion in the front-rear direction, the portions being recessed with respect to the roller portion. As a result, in both of the changing from the working state to the non-working state and the changing from the non-working state to the working state, the roller portion moves over the projecting portion of the contact surface. One of the roller portion and the contact is biased toward the other one. Therefore, in order to cause the roller portion to move over a projecting portion, the worker has to apply a force to the up/down lever. Even if the worker unintentionally hits the up/down lever, the changing to the working state or the non-working state does not easily occur.

The working state and the non-working state can be mutually changed when the up/down lever moves in the front-rear direction of the work vehicle. The operation device can further include an up/down guide plate that includes an up/down guide hole and guides the up/down lever, the up/down lever being inserted in the up/down guide hole. The up/down guide hole may include a first hole portion extending in the front-rear direction to guide the movement of the up/down lever in the front-rear direction to mutually change the working state and the non-working state, and a second hole portion extending in a width direction of the work vehicle from one end portion of the first hole portion in the front-rear direction to guide movement of the up/down lever in the width direction to maintain the non-working state. By virtue of this, the worker can maintain the non-working state only by moving the up/down lever in a width direction after changing to the non-working state. Even if the worker unintentionally hits the up/down lever, the changing from the non-working state to the working state does not easily occur, and the changing to the working state in a non-working region can be restricted.

The second hole portion may extend toward an outside in the width direction from the one end portion of the first hole portion in the front-rear direction. The operation device may further include a first biasing member to bias the up/down lever toward the outside in the width direction, the up/down lever being positioned in the second hole portion. Even if the worker unintentionally hits the up/down lever, the changing from the non-working state to the working state does not easily occur further. Also, the worker can more easily move the up/down lever when the worker moves the up/down lever from the position distant from his/her body to the position near his/her body than when the worker moves the up/down lever from the position near his/her body to the position distant from his/her body. Therefore, when the up/down lever is to be moved against the biasing force of a biasing member, a load on the worker can be reduced by moving the up/down lever from the position distant from his/her body to the position near his/her body.

The up/down guide hole may include a third hole portion extending toward an outside in the width direction of the work vehicle from another end portion of the first hole portion in the front-rear direction to guide the movement of the up/down lever in the width direction to maintain the working state. The operation device may further include a first biasing member to bias the up/down lever toward the outside in the width direction, the up/down lever being positioned in the third hole portion. By virtue of this, even if the worker unintentionally hits the up/down lever, the changing from the working state to the non-working state does not easily occur further. Also, the worker can more easily move the up/down lever when the worker moves the up/down lever from the position distant from his/her body to the position near his/her body than when the worker moves the up/down lever from the position near his/her body to the position distant from his/her body. Therefore, when the up/down lever is to be moved against the biasing force of a biasing member, a load on the worker can be reduced by moving the up/down lever from the position distant from his/her body to the position near his/her body.

An operation device of a work vehicle according to an aspect of a preferred embodiment of the present invention may further include a restrictor to restrict movement of the up/down lever to maintain the working state. By virtue of this, even if the worker unintentionally hits the up/down lever, the changing from the working state to the non-working state does not easily occur.

The up/down lever may be between the position lever and the sensitivity adjustment lever in the width direction of the work vehicle. By virtue of this, operation of the up/down lever after operating the position lever and the sensitivity adjustment lever can be facilitated. Similarly, operation of the position lever and the sensitivity adjustment lever after operating the up/down lever can be facilitated. As a result, operability of the worker can be improved.

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present specification and drawings, elements having substantially the same functions and structures are denoted by the same reference numerals, and redundant description thereof is omitted, and elements not directly related to preferred embodiments of the present invention are omitted from the drawings.

Figure 2:
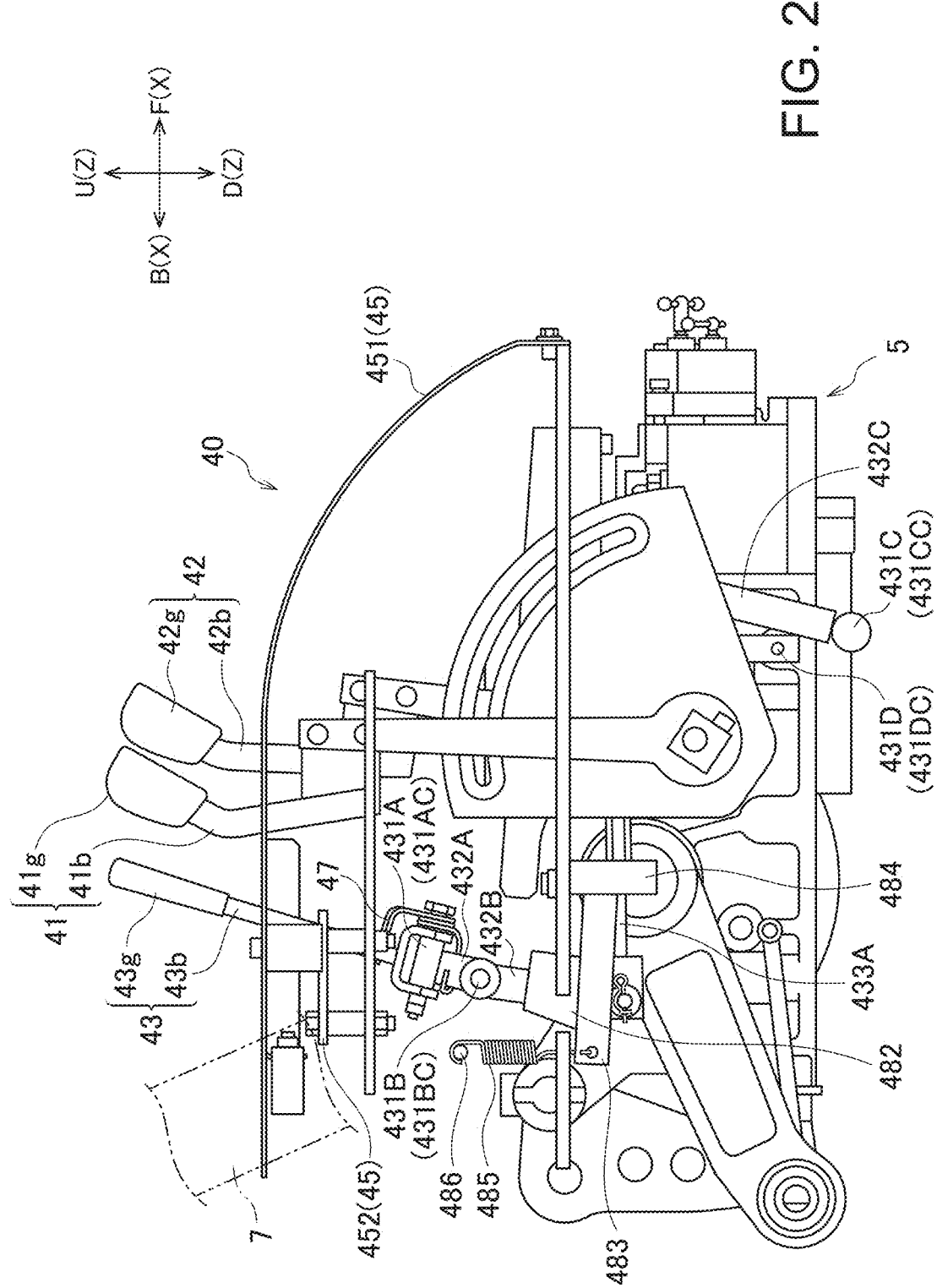
FIG. 2 is a right side view of an operation device according to a preferred embodiment of the present invention.
Figure 3:
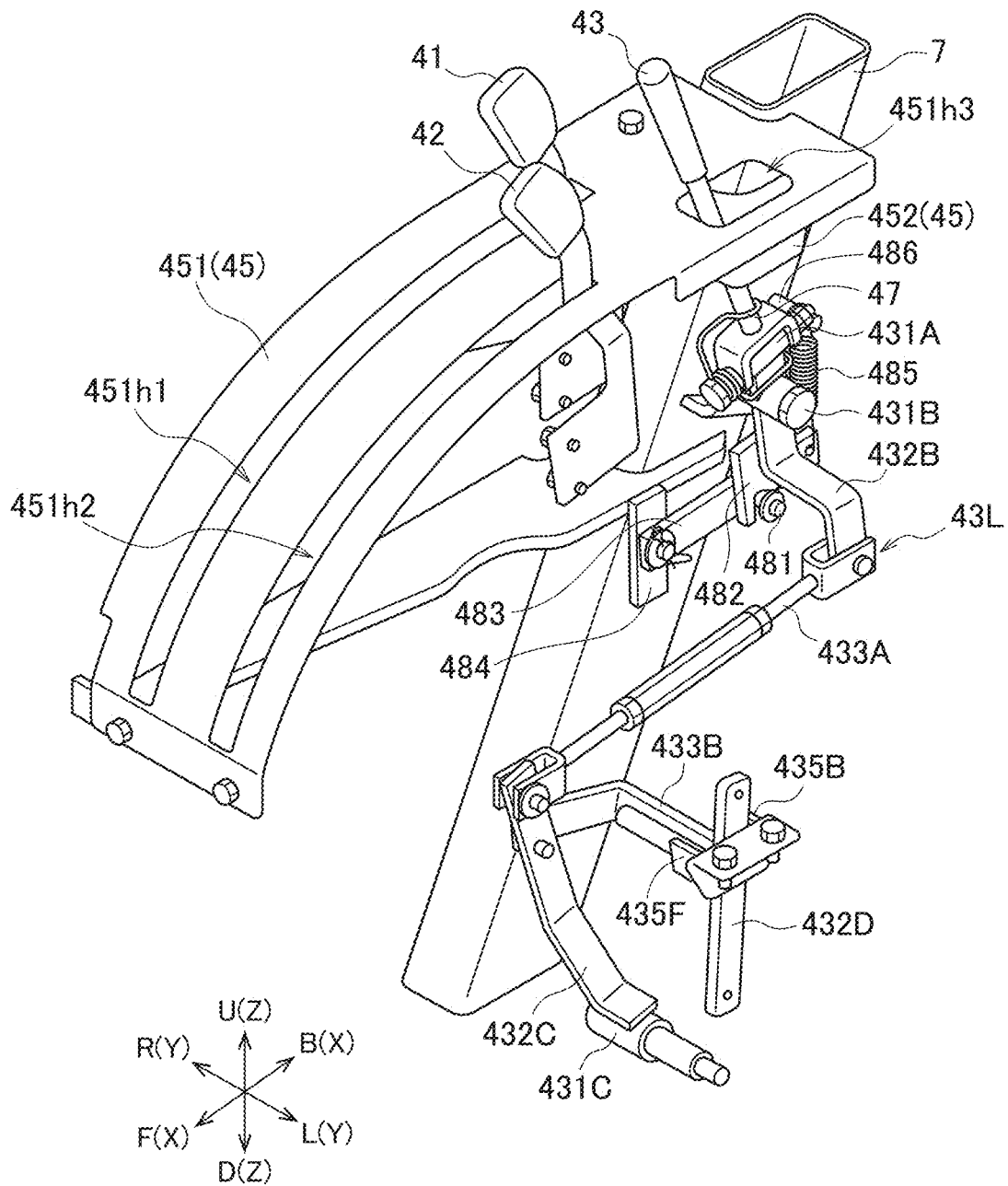
FIG. 3 is a perspective view (number 1) viewed from an upper left front side of an operation device according to a preferred embodiment of the present invention.
Figure 4:
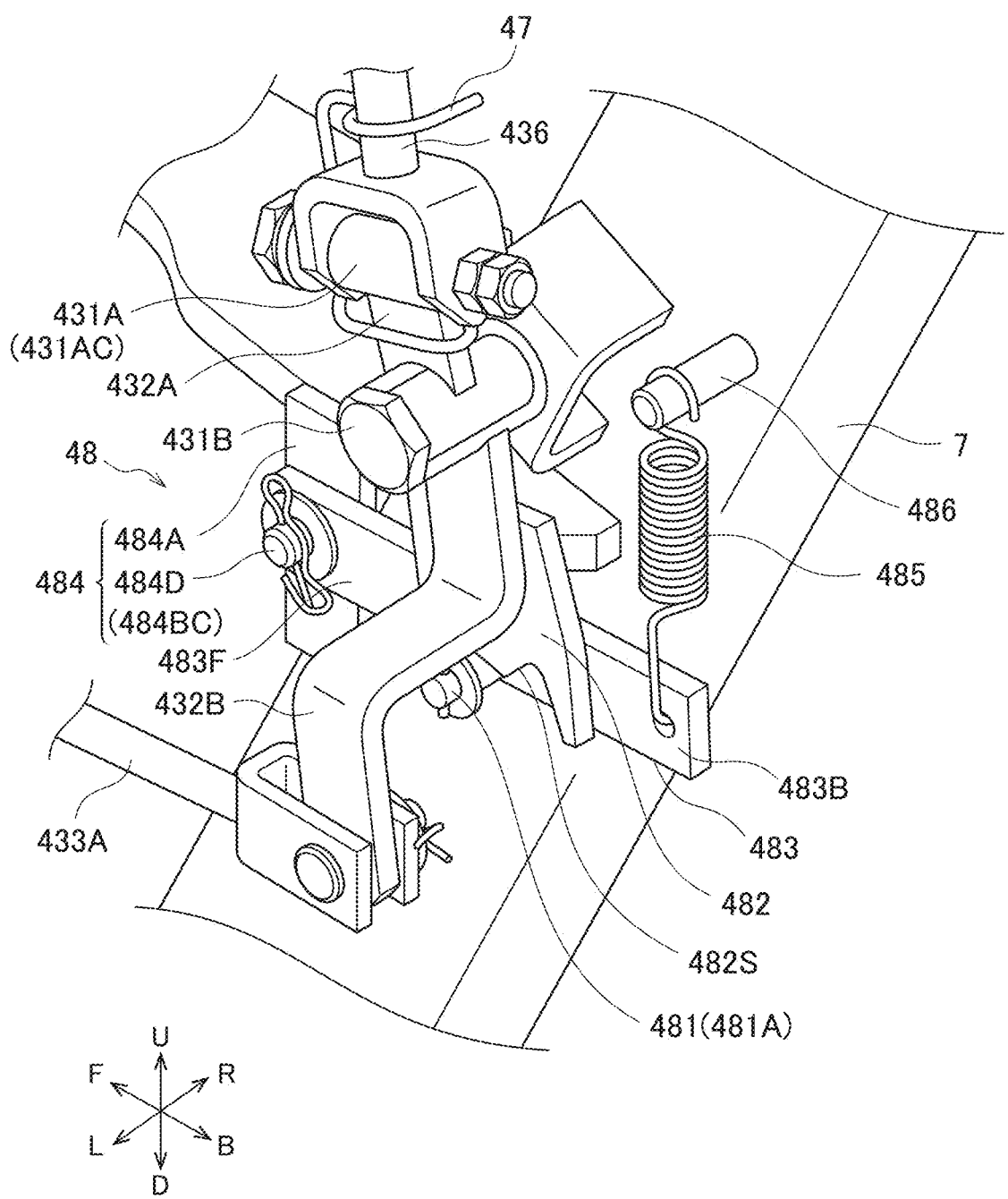
FIG. 4 is an enlarged perspective view of a portion of an operation device according to a preferred embodiment of the present invention viewed from an upper left rear side.
Figure 5:
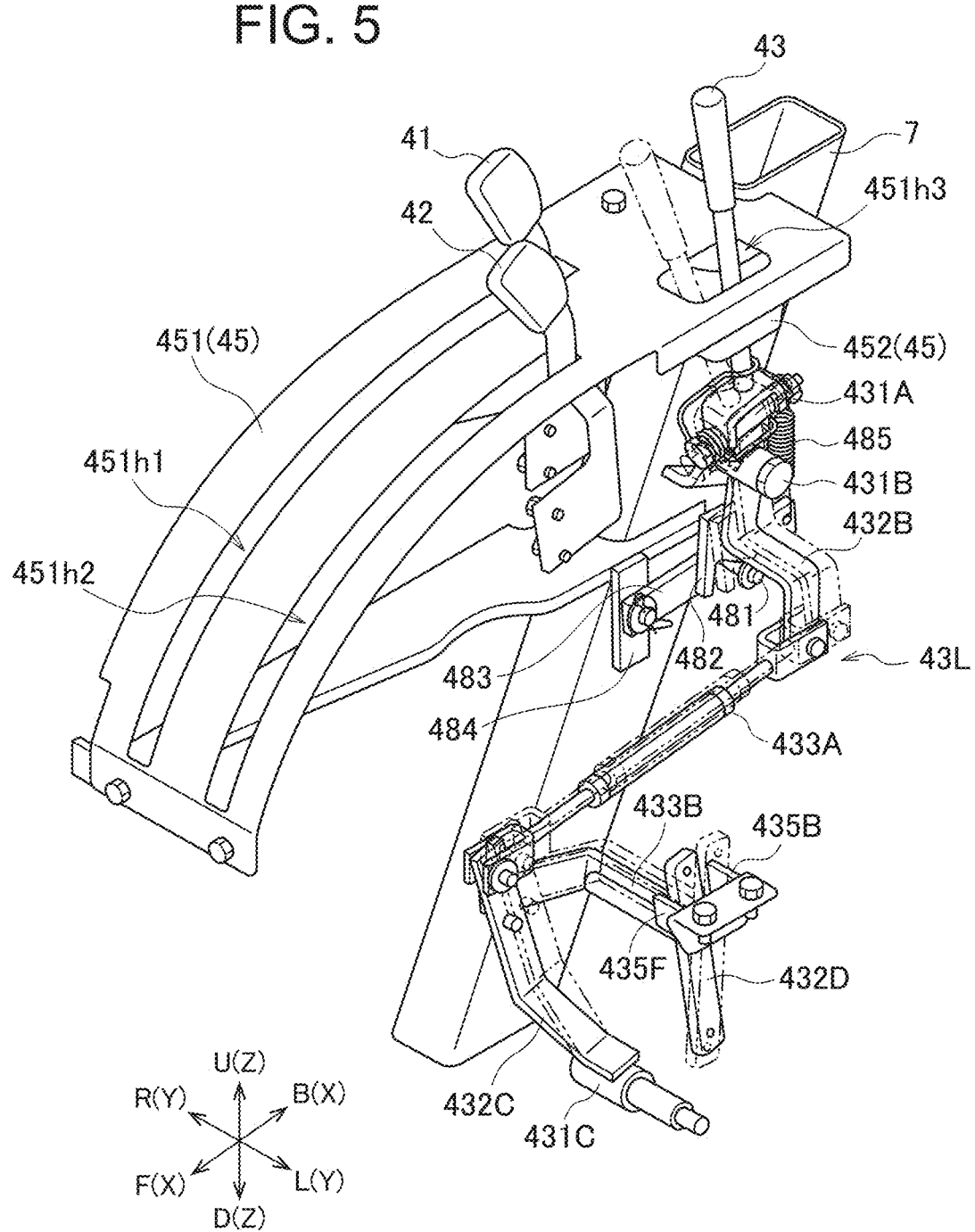
FIG. 5 is a perspective view (number 2) viewed from an upper left front side of an operation device according to a preferred embodiment of the present invention.
Figure 6:
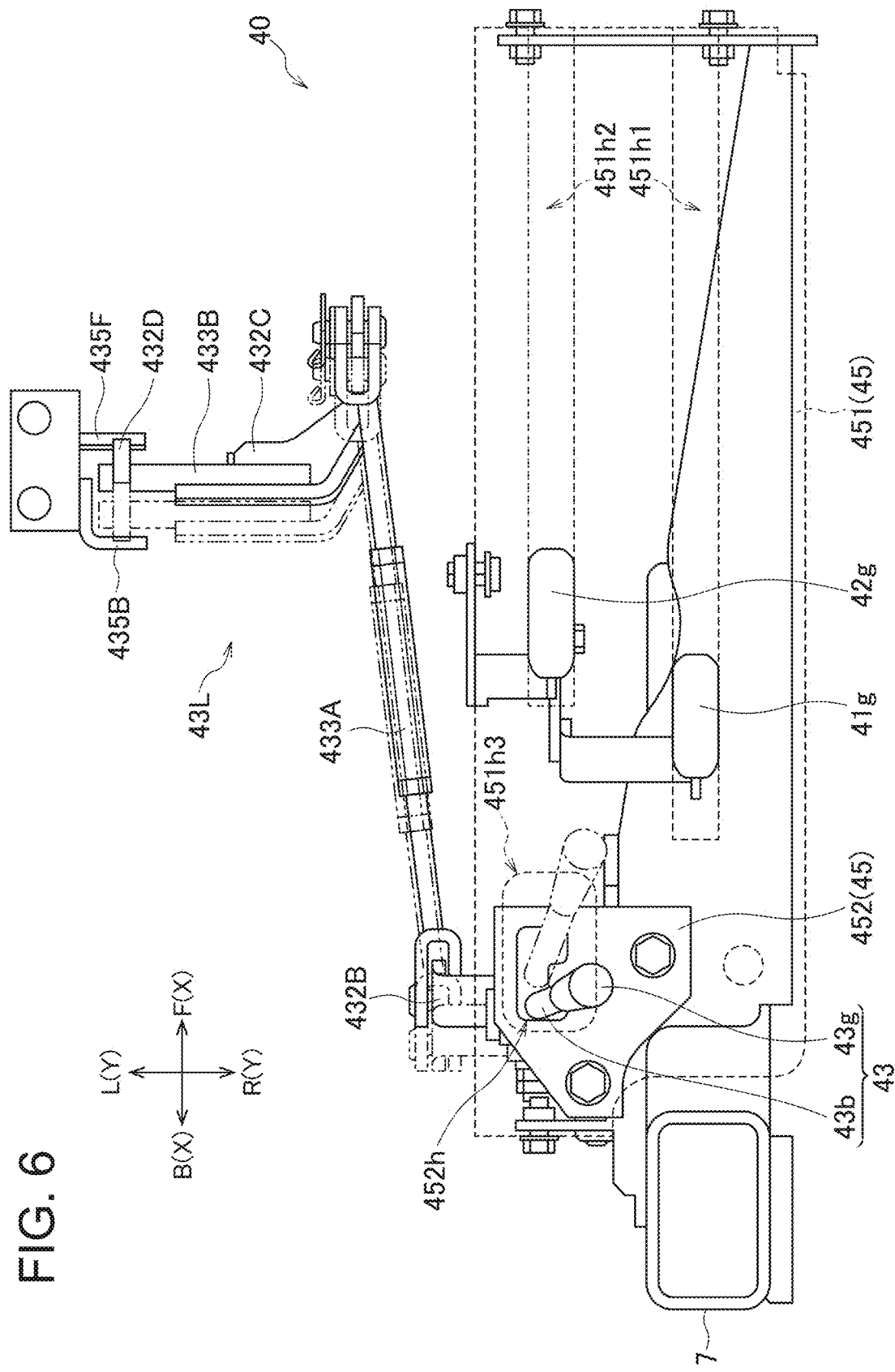
FIG. 6 is a top view of an operation device according to a preferred embodiment of the present invention.
Figure 7A:
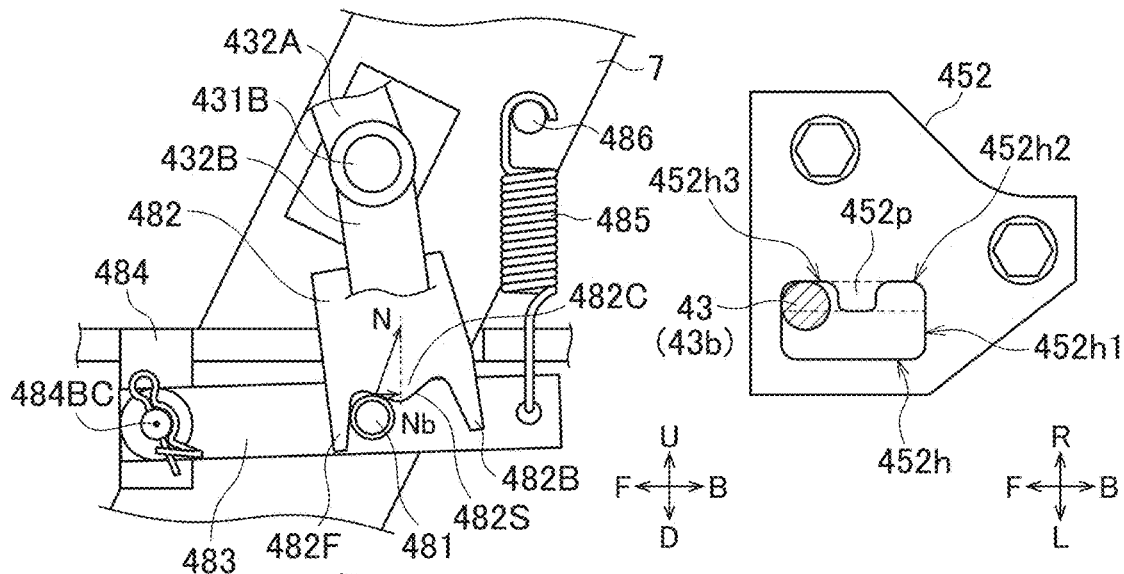
FIGS. 7A to 7C illustrate explanatory diagrams for describing movement of an operation device according to a preferred embodiment of the present invention.
Figure 7B:
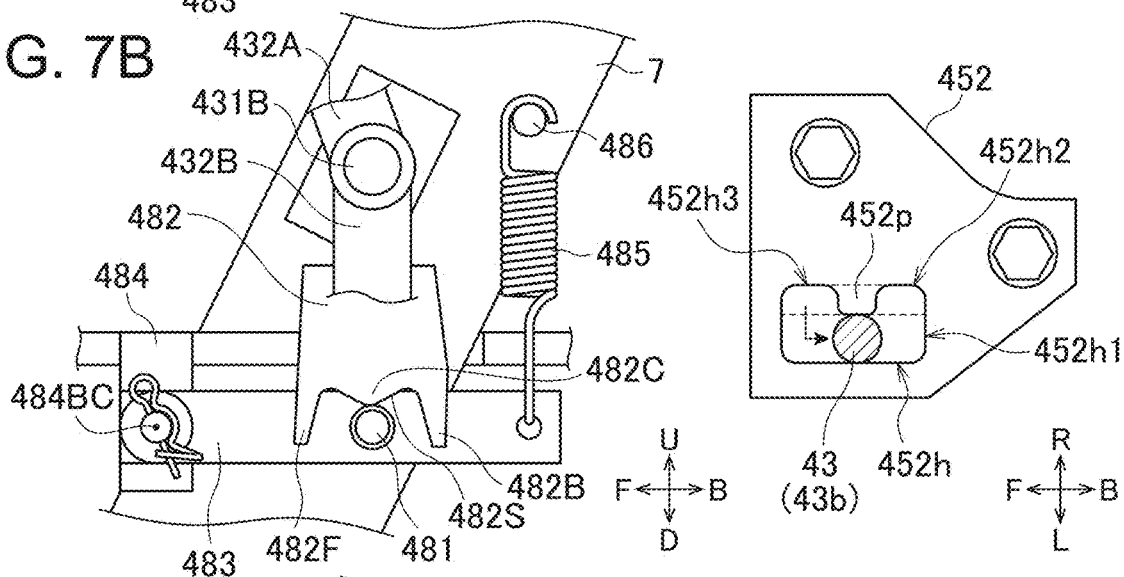
Figure 7C:
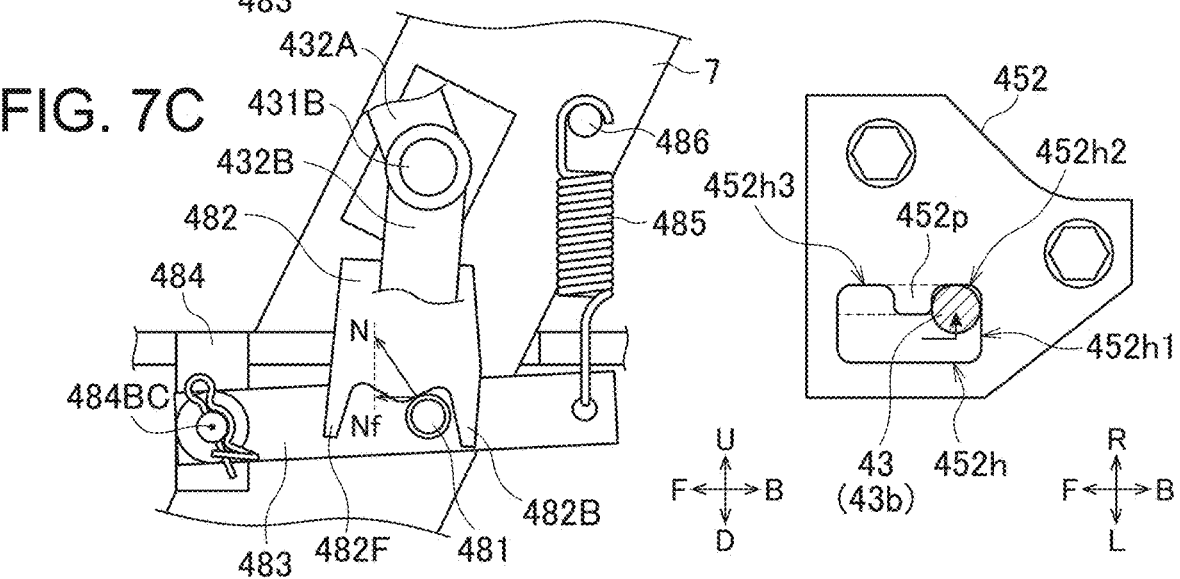

A schematic configuration of a work vehicle 1 will be described with reference to FIGS. 1 and 2. In the following description, directions indicated by arrows X, Y, and Z in the drawings are defined as a front-rear direction of the traveling vehicle, a width direction of the traveling vehicle, and a height direction of the traveling vehicle, respectively. In addition, directions indicated by arrows U, D, F, B, L, and R in the drawings are defined as an upward direction, a downward direction, a forward direction, a backward direction, a left direction, and a right direction, respectively. Note that FIG. 2 to FIG. 4 illustrate a position of an up/down lever in a working state, and FIG. 5 and FIG. 6 illustrate a position of the up/down lever after the working state is changed to a non-working state. Left diagrams of FIGS. 7A to 7C are left side views of a restriction mechanism and illustrate positional relations between a roller portion and a contact member in each state. Right diagrams of FIGS. 7A to 7C are top views of an up/down guide plate and illustrate positions of the up/down lever in each state. FIG. 7A is a diagram illustrating the working state, FIG. 7B is a diagram illustrating a state during changing from the working state to the non-working state, and FIG. 7C is a diagram illustrating the non-working state. It should be noted that, in each diagram, illustration of some members may be omitted for the convenience of explanation.

FIG. 1 illustrates the work vehicle 1. The work vehicle 1 according to this preferred embodiment is a tractor. The work vehicle 1 includes a pair of right-and-left front wheels 2F and a pair of right-and-left rear wheels 2B. The front wheels 2F and the rear wheels 2B are driven by a driving force from an engine 3 placed in a prime mover and causes the work vehicle 1 to travel.

A work vehicle 1 may be provided with a drive unit 4, a transmission case 5, a rollover protective frame 7, and a link mechanism 10. The drive unit 4 includes a driver seat 4S, which is positioned in the rear of a motive power unit. The transmission case 5 defines a rear portion of a vehicle body frame. The rollover protective frame 7 defines a rollover protective structure (ROPS: rollover protective structure), which is provided to protect a worker if the work vehicle 1 rolls over. The rollover protective frame 7 is disposed between a pair of right and left rear-wheel fenders disposed above rear wheels 2B. The rollover protective frame 7 is disposed in the rear with respect to the driver seat 4S. The rollover protective frame 7 includes support frame parts, which extend in an upward direction U from both outsides with respect to the driver seat 4S in a width direction Y, and an upper frame part, which extends in the width direction Y above the driver seat 4S and connects the right and left support frame parts.

The link mechanism 10 includes a pair of right and left lift arms 11, a top link 12A, and a pair of right and left lower links 12B in the rear of the transmission case 5. The pair of right and left lift arms 11 suspends and supports the pair of right and left lower links 12B via right and left support members. A work device 20 is coupled to a vehicle-body rear portion of the work vehicle 1 via the link mechanism 10. In the present preferred embodiment, the work device 20 is a tilling device for carrying out tilling work. Specifically, the work device 20 is a rotary tilling device. In the work vehicle 1, a drive power of an engine 3 taken from a power-takeoff shaft provided in the rear portion of the vehicle body frame is transmitted to the rotary tilling device (the work device 20). The lift arm 11 is hydraulically driven so as to be able to swing vertically by a hydraulic cylinder housed in the transmission case 5. The hydraulic cylinder subjects the link mechanism 10 to up/down drive via the lift arms 11. The hydraulic cylinder is controlled by a control valve housed in the transmission case 5.

As illustrated in FIG. 1, the work device 20 (rotary tilling device) includes a tilling-depth detection mechanism 22. The tilling-depth detection mechanism 22 includes a rear cover 23, which is provided in the work device 20 so as to cover the rear of a tilling rotor 21 of the work device 20, and an output link 25, which is configured to interlock an input arm portion via an interlock rod 24 at an upper end portion of the rear cover 23 and is provided in a machine-body upper portion of the work device 20.

The rear cover 23 is coupled to an upper cover 26, which is configured to cover the upper portion of the tilling rotor 21 and is fixed to the machine body of the work device 20, so as to be vertically swingable about a shaft core, which is positioned at an upper end portion of the rear cover 23 and is transverse to the machine body. A descension operation spring 27, which is provided across a spring receiver of the rear cover 23 and a spring supporter of the upper cover 26, swingably biases the rear cover 23 downward, and the lower end side of the rear cover 23 is configured to contact the ground which has undergone tilling carried out by the tilling rotor 21. The output link 25 is coupled to a bracket fixed on the machine body of the work device 20 so as to be able to turn about the shaft core. As the rear cover 23 vertically swings, the output link 25 swings about the shaft core as the output link is interlocked with the rear cover 23 because of the interlock rod 24. The tilling-depth detection mechanism 22 uses the rear cover 23 as a ground sensor, detects a tilling depth of the work device 20 based on a swing angle of the ground sensor with respect to the upper cover 26, outputs this detection result from an output arm portion of the output link 25, and transmits the detection result to the control valve.

The work vehicle 1 is provided with an operation device 40, which is provided with operation levers to carry out operations related to the work device 20. In the present preferred embodiment, the operation levers are disposed on the right side of the driver seat. The operation device 40 includes a position lever 41, a sensitivity adjustment lever 42, and an up/down lever 43 as the operation levers. The position lever 41 is a lever to set the height of the work device 20. The sensitivity adjustment lever 42 is a lever to adjust up/down sensitivity of the work device 20. In the present preferred embodiment, an up/down sensitivity corresponding to a variation in the tilling depth can be adjusted by the sensitivity adjustment lever 42.

The up/down lever 43 is a lever to selectively change a working state and a non-working state. The working state is a state in which the work device 20 is positioned at a height (control target height) set by the position lever. The non-working state is a state in which the work device 20 is positioned above the set height. The non-working state is a state in which the work device 20 does not ground.

The position lever 41 is disposed on the driver seat 4S side (left side) with respect to the sensitivity adjustment lever 42. The position lever 41 is interlocked with and coupled to the control valve, which controls the hydraulic cylinder (the lift arm 11), via a first work link mechanism. The position lever 41 is disposed so as to be able to swing toward the front and the rear. As the position lever 41 is swung toward the rear B (counterclockwise direction in FIG. 2), the lift arm 11 ascends to a position corresponding to the position of the position lever 41. On the other hand, as the position lever 41 is swung toward the front F (clockwise direction in FIG. 2), the lift arm 11 descends to a position corresponding to the position of the position lever 41. The position lever 41 includes a first lever main-body part 41b, which is coupled to the first work link mechanism, and a first grip part 41g, which is provided in an upper portion of the first lever main-body part 41b and is held by the worker.

The sensitivity adjustment lever 42 is disposed outside (right side) with respect to the position lever 41 in the width direction Y. The sensitivity adjustment lever 42 is interlocked with and coupled to the control valve, which controls the hydraulic cylinder (the lift arm 11), via a second work link mechanism. The sensitivity adjustment lever 42 is disposed to be able to swing toward the front and the rear about the same pivot point as the position lever 41. As the sensitivity adjustment lever 42 is swung toward the rear B (counterclockwise direction in FIG. 2), the actuation sensitivity with respect to the variation in the tilling depth detected from the work device 20 (the rotary tilling device) becomes sensitive, and the responsiveness of up/down movement of the work device 20 becomes higher. In other words, the up/down movement degree with respect to the variation in the tilling depth increases. On the other hand, as the sensitivity adjustment lever 42 is swung toward the front F (clockwise direction in FIG. 2), the actuation sensitivity with respect to the variation in the tilling depth detected from the work device 20 (the rotary tilling device) becomes less sensitive, and the responsiveness of up/down movement of the work device 20 becomes lower. In other words, the up/down movement degree with respect to the variation in the tilling depth decreases. The sensitivity adjustment lever 42 includes a second lever main-body part 42b, which is coupled to the second work link mechanism, and a second grip part 42g, which is provided in an upper portion of the second lever main-body part 42b and is held by the worker.

As illustrated in FIG. 2, the up/down lever 43 is disposed in the rear with respect to the position lever 41 and the sensitivity adjustment lever 42. The up/down lever 43 is interlocked with and coupled to the control valve, which controls the hydraulic cylinder (the lift arm 11), via a third work link mechanism 43L. The up/down lever 43 includes a third lever main-body part 43b, which is coupled to the third work link mechanism 43L, and a third grip part 43g, which is provided in an upper portion of the third lever main-body part 43b and is held by the worker. The working state and the non-working state are changed when the up/down lever 43 is moved in the front-rear direction X of the work vehicle 1.

The third work link mechanism 43L is a mechanical link mechanism. Therefore, the selective changing between the working state and the non-working state is not carried out by electrical control corresponding to operation of the up/down lever 43. The third work link mechanism 43L may include a first swing shaft part 431A, a first arm 432A, a second swing shaft part 431B, a second arm 432B, a first coupling rod 433A, a third arm 432C, a third swing shaft part 431C, a second coupling rod 433B, a fourth arm 432D, and a fourth swing shaft part 431D.

The first swing shaft part 431A is interlocked with and coupled to a lower end portion of the third lever main-body part 43b. The third lever main-body part 43b (the up/down lever 43) can swing about a first shaft center 431AC of the first swing shaft part 431A, which defines and functions as a pivot point. In the present preferred embodiment, the third lever main-body part 43b can swing in the width direction Y. An upper end portion of the first arm 432A is fixed to the first swing shaft part 431A.

The first arm 432A is fixed to the second swing shaft part 431B and can swing about a second shaft center 431BC of the second swing shaft part 431B, which defines and functions as a pivot point. In the present preferred embodiment, the first arm 432A can swing in the front-rear direction X. In response to swinging of the second swing shaft part 431B, the up/down lever 43 also swings. Therefore, the up/down lever 43 can turn about the second shaft center 431BC, which defines and functions as the pivot point.

The second arm 432B is fixed to the second swing shaft part 431B. The second arm 432B is relatively fixed with respect to the first arm 432A. In response to swinging of the first arm 432A, the second arm 432B swings while using the second shaft center 431BC as the pivot point.

The first coupling rod 433A is a rod extending in the front-rear direction X. A rear end portion of the first coupling rod 433A is interlocked with and coupled to the second arm 432B, and a front end portion of the first coupling rod 433A is interlocked with and coupled to the third arm 432C.

The third arm 432C is coupled to the first coupling rod 433A and the second coupling rod 433B. The third arm 432C can swing about a third shaft center 431CC of the third swing shaft part 431C, which is positioned at a lower end portion of the third arm 432C and defines and functions as a pivot point. The third swing shaft part 431C is fixed to the transmission case 5 and extends from the transmission case 5 toward outside in the width direction Y.

The second coupling rod 433B is interlocked with and coupled to the third arm 432C and the fourth arm 432D. The fourth arm 432D swings while using a fourth shaft center 431DC of the fourth swing shaft part 431D as a pivot point. The fourth swing shaft part 431D is interlocked with and coupled to the control valve and turns in response to the swinging of the fourth arm 432D.

Details of the operation device 40 will be described. As illustrated in FIG. 2, FIG. 3, FIG. 6, etc., the operation device 40 is provided with a guide plate 45, which guides the operation levers. The guide plate 45 may have an overall guide plate 451 and an up/down guide plate 452. The overall guide plate 451 guides the position lever 41, the sensitivity adjustment lever 42, and the up/down lever 43. The overall guide plate 451 includes a first guide hole 451$h$1 in which the position lever 41 is inserted, a second guide hole 451$h$2 in which the sensitivity adjustment lever 42 is inserted, and a third guide hole 451$h$3 in which the up/down lever 43 is inserted. The overall guide plate 451 may be positioned above the up/down guide plate 452. The up/down guide plate 452 may be positioned above the first swing shaft part 431A. Note that, when the up/down lever 43 is guided by the up/down guide plate 452, the up/down lever 43 is not required to be guided by the third guide hole 451$h$3.

The up/down guide plate 452 guides the up/down lever 43. The up/down guide plate 452 is not required to guide the other operation levers. The up/down guide plate 452 has an up/down guide hole 452$h$ in which the up/down lever 43 is inserted. As illustrated in FIGS. 7A to 7C, the up/down guide hole 452$h$ may include a first hole portion 452$h$1, a second hole portion 452$h$2, and a third hole portion 452$h$3. The first hole portion 452$h$1 is extending in the front-rear direction X and guides the movement of the up/down lever 43 in the front-rear direction X to change the working state and the non-working state. The second hole portion 452$h$2 is extending in the width direction Y of the work vehicle 1 from a first end portion of the first hole portion 452$h$1 in the front-rear direction X and guides the movement of the up/down lever 43 in the width direction Y for maintaining the non-working state. The third hole portion 452$h$3 is extending in the width direction Y of the work vehicle 1 from a second end portion of the first hole portion 452$h$1 in the front-rear direction X and guides the movement of the up/down lever 43 in the width direction Y to maintain the working state. Each of the second hole portion 452$h$2 and the third hole portion 452$h$3 may extend toward outside in the width direction Y from the end portion of the first hole portion 452$h$1 in the front-rear direction X. In the present preferred embodiment, the second hole portion 452$h$2 extends toward the outside in the width direction Y from the rear end portion of the first hole portion 452$h$1, and the third hole portion 452$h$3 extends toward the outside in the width direction Y from the front end portion of the first hole portion 452$h$1. Also, the up/down guide plate 452 may include a guide projecting portion 452$p$, which is projecting toward the up/down guide hole 452$h$ and is positioned between the second hole portion 452$h$2 and the third hole portion 452$h$3 in the front-rear direction X.

As illustrated in FIG. 2, FIG. 6, etc., the up/down lever 43 is disposed in the rear with respect to the position lever 41 and the sensitivity adjustment lever 42. A front edge of the third guide hole 451$h$3 may be positioned in the rear with respect to a rear edge of the first guide hole 451$h$1 and a rear edge of the second guide hole 451$h$2. The second guide hole 451$h$2 and the third guide hole 451$h$3 may be disposed at the positions which are overlapped with each other in the front-rear direction X in a top view of the work vehicle 1. The up/down lever 43 may be disposed in the inner side in the width direction Y with respect to the rollover protective frame 7. The up/down lever 43 may be disposed in the inner side in the width direction Y with respect to the position lever 41.

As illustrated in FIG. 3, FIG. 4, etc., the operation device 40 may be provided with a biasing member 47 (first biasing member). The biasing member 47 biases the up/down lever 43, which is positioned in the second hole portion 452$h$2, toward the outside in the width direction Y. Also, the biasing member 47 biases the up/down lever 43, which is positioned in the third hole portion 452$h$3, toward the outside in the width direction Y. The biasing member 47 is fixed to the first swing shaft part 431A and the first arm 432A and biases the position lever 41 toward the outside in the width direction Y. In the present preferred embodiment, the biasing member 47 is a spring.

The operation device 40 may be provided with a restriction mechanism 48, which restricts the changing between the working state and the non-working state. The restriction mechanism 48 (the operation device 40) is provided with a roller portion 481, a contact member 482, a swing member 483, a support member 484, a restriction biasing member 485, and a suspension support member 486.

The roller portion 481 may include, for example, a tubular member 481A, which can be turned, and a support portion (not illustrated), which is inserted in the tubular member 481A and is extending in the width direction Y. The support portion is fixed to the swing member 483 and is extending toward the inner side in the width direction Y from the swing member 483.

The contact member 482 is fixed to the second arm 432B. The contact member 482 moves in the front-rear direction X in response to the movement of the up/down lever 43 in the front-rear direction X. As a result, the contact member 482 relatively moves with respect to the roller portion 481 while in contact with the roller portion 481. A first end portion (upper end portion) of the contact member 482 is fixed to the second arm 432B. As illustrated in FIGS. 7A to 7C, a second end portion (lower end portion) of the contact member 482 includes a front-side extending portion 482F which is in front of the roller portion 481 and extending toward the lower side of the roller portion 481, a rear-side extending portion 482B which is in the rear with respect to the roller portion 481 and extending toward the lower side of the roller portion 481, and a projecting portion 482C which is between the front-side extending portion 482F and the rear-side extending portion 482B in the front-rear direction X and projecting toward the roller portion 481. In the present preferred embodiment, since the roller portion 481 is positioned below the contact member 482, the projecting portion 482C is projecting downward. The portion between the front-side extending portion 482F and the projecting portion 482C is recessed upward, and the portion between the projecting portion 482C and the rear-side extending portion 482B is recessed upward.

The contact member 482 includes a contact surface 482S, which contacts the roller portion 481. The contact surface 482S is at least a portion of a lower end surface of the contact member 482 between the front-side extending portion 482F and the rear-side extending portion 482B. Also, at least a portion of the contact surface 482S includes the lower end surface of the projecting portion 482C. Therefore, the contact surface 482S includes a portion projecting toward the roller portion 481 in the vertical direction Z and includes portions recessed toward the roller portion 481 in both sides of the projecting portion in the front-rear direction X. By virtue of this, the contact surface 482S causes the roller portion 481 to move in the vertical direction Z of the work vehicle 1 while causing the roller portion 481 to relatively move in the front-rear direction X with respect to the contact member 482.

The swing member 483 can swing while using a later-described fifth shaft center 484BC of a fifth swing shaft part 484B as a pivot point. A first end portion (front end portion 483F) of the swing member 483 in the front-rear direction X is supported by the fifth swing shaft part 484B. A second end portion (rear end portion 483B) of the swing member 483 in the front-rear direction X is biased toward the contact member 482. Specifically, the restriction biasing member 485 is attached to the rear end portion 483B of the swing member 483.

The support member 484 supports the swing member 483. The support member 484 is fixed to the rollover protective frame 7 via a reinforcement member. The support member 484 includes a board 484A and the fifth swing shaft part 484B, which is extending toward the inner side in the width direction Y from the board 484A. The fifth swing shaft part 484B is inserted in an opening provided in the swing member 483. The swing member 483 is positioned between the board 484A and a pin inserted in the fifth swing shaft part 484B.

The restriction biasing member 485 biases one of the roller portion 481 and the contact member 482 toward the other one of the roller portion 481 and the contact member 482. In the present preferred embodiment, the restriction biasing member 485 biases the swing member 483 in the upward direction, in other words, toward the contact member 482. As a result, the roller portion 481 supported by the swing member 483 is biased toward the contact member 482. A lower end portion of the restriction biasing member 485 is attached to the swing member 483. An upper end portion of the restriction biasing member 485 is attached by the suspension support member 486, which is extending toward the inner side in the width direction Y from the rollover protective frame 7. As a result, the restriction biasing member 485 is suspended and supported. The restriction biasing member 485 is a spring and pulls the swing member 483 upward by contraction of the spring.

A case in which the working state is changed to the non-working state when the worker operates the up/down lever 43 will be described. As illustrated in FIG. 3, etc., the state in which the up/down lever 43 is positioned in the front side is the working state. As illustrated in the right diagram of FIG. 7A, at least a portion of the third lever main-body part 43$b$ of the up/down lever 43 is positioned in the third hole portion 452$h$3. By virtue of this, even when the worker unintentionally hits the up/down lever 43, the movement of the up/down lever 43 toward the rear side can be restricted by the guide projecting portion 452$p$. The rest of the third lever main-body part 43$b$ may be positioned in the first hole portion 452$h$1. Herein, as illustrated in the left diagram of FIG. 7A, the roller portion 481 is biased toward the contact member 482 (in other words, toward the upper side) by the restriction biasing member 485. Therefore, the contact member 482 receives a normal force N from the roller portion 481. A force Nb of a rear component of the normal force N applies a rearward force to the contact member 482, and, in FIG. 7A, a counterclockwise force works on the second arm 432B, which is fixed to the contact member 482, while the second shaft center 431BC of the second swing shaft part 431B defines and functions as a pivot point. As a result, the force which moves the up/down lever 43 toward the front side works. Therefore, even if the up/down lever 43 is positioned only in the first hole portion 452$h$1, the up/down lever does not automatically move toward the rear side.

As illustrated in FIG. 5 to FIGS. 7A to 7C, the worker operates to swing the up/down lever 43 toward the rear side. Specifically, the worker moves the up/down lever 43 toward the inner side (leftward direction L) in the width direction Y and then moves the up/down lever from the front side to the rear side along the first hole portion 452$h$1. As a result, the first arm 432A swings toward the rear side while the second shaft center 431BC defines and functions as the pivot point. As a result, the second arm 432B swings toward the front side while the second shaft center 431BC defines and functions as the pivot point, and the first coupling rod 433A slides toward the front side. The third arm 432C swings toward the front side while the third shaft center 431CC defines and functions as the pivot point. In response to the swinging of the third arm 432C, the second coupling rod 433B slides toward the front side, and the fourth arm 432D slides toward the front side while the fourth shaft center 431DC defines and functions as the pivot point. The swinging of the fourth arm 432D toward the front side is restricted by a front-side stopper 435F provided in the front side of the fourth arm 432D. In response to the swinging of the fourth arm 432D toward the front side, the lift arm 11 ascends, and the work device 20 ascends.

When the up/down lever 43 moves from the front side toward the rear side, the roller portion 481 relatively moves with respect to the contact member 482 while rolling on the contact surface 482S. In response to the movement of the up/down lever 43 toward the rear side, the contact member 482 moves toward the front side. As a result, the roller portion 481 relatively moves toward the rear side with respect to the contact member 482. The roller portion 481 moves downward along the contact surface 482S until the roller portion 481 reaches an apex of the projecting portion 482C of the contact member 482. As a result, the swing member 483 swings downward while the fifth shaft center 484BC defines and functions as the pivot point. When the roller portion 481 passes the apex of the projecting portion 482C, the roller portion 481 moves upward along the contact surface 482S. As a result, the swing member 483 swings upward while the fifth shaft center 484BC defines and functions as the pivot point.

Note that, as illustrated in the left diagram of FIG. 7B, the force Nb of the rear component of the normal force N works on the contact member 482 until the roller portion 481 reaches the apex of the projecting portion 482C. On the other hand, when the roller portion 481 passes the apex of the projecting portion 482C, a force Nf of a front component of the normal force N works on the contact member 482. The force Nf of the front component of the normal force N applies a frontward force to the contact member 482, and a clockwise force works on the second arm 432B while the second shaft center 431BC of the second swing shaft part 431B defines and functions as the pivot point. As a result, the force which moves the up/down lever 43 toward the rear side works. Therefore, the movement of the up/down lever 43 toward the rear side is facilitated.

Then, as illustrated in FIG. 6, the worker may operate the up/down lever 43 toward the outside (rightward direction R) in the width direction Y. Also, the up/down lever 43 may be moved toward the outside in the width direction Y by the biasing force of the biasing member 47. The up/down lever 43 moves from the inner side toward the outside in the width direction Y along the second hole portion 452$h$2. As a result, the up/down lever 43 may swing toward the outside in the width direction Y while the first shaft center 431AC defines and functions as the pivot point. In this case, as illustrated in the right diagram of FIG. 7C, at least a portion of the third lever main-body part 43$b$ of the up/down lever 43 is positioned in the second hole portion 452$h$2. By virtue of this, even when the worker unintentionally hits the up/down lever 43, the movement of the up/down lever 43 toward the front side can be restricted by the guide projecting portion 452p. The rest of the third lever main-body part 43b may be positioned in the first hole portion 452h1.

Also, as illustrated in the left diagram of FIG. 7C, the roller portion 481 is biased toward the contact member 482 (in other words, toward the upper side), by the restriction biasing member 485. Therefore, the frontward force is applied to the contact member 482 by the force Nf of the front component of the normal force N. As a result, in the left diagram of FIG. 7C, a clockwise force works on the second arm 432B while the second shaft center 431BC of the second swing shaft part 431B defines and functions as the pivot point. As a result, the force which moves the up/down lever 43 toward the rear side works. Therefore, even if the up/down lever 43 is positioned only in the first hole portion 452h1, the up/down lever does not automatically move toward the front side. Note that, as illustrated in the right diagram of FIG. 7C, in the case in which the up/down lever 43 is positioned in the second hole portion 452h2 or in the rear portion of the first hole portion 452h1 (in other words, the non-working state), the biasing force of the biasing member 47 (elastic force of the spring) may be larger compared with the case in which the up/down lever 43 is positioned in the third hole portion 452h3 or in the front portion of the first hole portion 452h1 (in other words, the working state) as illustrated in the right diagram of FIG. 7A. In other words, the normal force N (the force Nf) of the non-working state may be larger than the normal force N (the force Nb) of the working state. Also, if the frontward hydraulic force caused by the hydraulic cylinder in the transmission case 5 is working on the up/down lever 43, the force Nf may be larger than the combined force of the force Nb and the hydraulic force. By virtue of this, the up/down lever 43 does not easily move toward the front side, and occurrence of the changing from the non-working state to the working state becomes more difficult.

A case in which the non-working state is changed to the working state when the worker operates the up/down lever 43 will be described. As illustrated in FIG. 5, FIG. 6, etc., the state in which the up/down lever 43 is positioned in the rear side is the non-working state. The worker may operate the up/down lever 43 toward the inner side in the width direction Y (the leftward direction L). As a result, the up/down lever 43 moves from the outside toward the inner side in the width direction Y along the second hole portion 452h2. As a result, the up/down lever 43 may swing toward the inner side in the width direction Y while the first shaft center 431AC defines and functions as the pivot point.

Then, the worker operates to swing the up/down lever 43 toward the front side. The up/down lever 43 moves from the rear side toward the front side along the first hole portion 452h1. As a result, the first arm 432A swings toward the front side while the second shaft center 431BC defines and functions as the pivot point. As a result, the second arm 432B swings toward the rear side while the second shaft center 431BC defines and functions as the pivot point, and the first coupling rod 433A slides toward the rear side. The third arm 432C swings toward the rear side while the third shaft center 431CC defines and functions as the pivot point. In response to the swinging of the third arm 432C, the second coupling rod 433B slides toward the rear side, and the fourth arm 432D slides toward the rear side while the fourth shaft center 431DC defines and functions as the pivot point. The swinging of the fourth arm 432D toward the rear side is restricted by the rear-side stopper 435B provided in the rear side of the fourth arm 432D. In response to the swinging of the fourth arm 432D toward the rear side, the lift arm 11 descends, and the work device 20 descends to the height set by the position lever 41.

Then, the worker may operate the up/down lever 43 toward the outside (rightward direction R) in the width direction Y. Also, the up/down lever 43 may be moved toward the outside in the width direction Y by the biasing force of the biasing member 47. The up/down lever 43 moves from the inner side toward the outside in the width direction Y along the first hole portion 452h1. As a result, the up/down lever 43 may swing toward the outside in the width direction Y while the first shaft center 431AC defines and functions as the pivot point.

In the present preferred embodiment, the up/down lever 43 is disposed in the rear with respect to the position lever 41 and the sensitivity adjustment lever 42. In many cases, the worker changes the state of the work device 20 between the working state and the non-working state by the up/down lever 43 while the worker actually visually checks the work device 20 disposed in the rear side of the work vehicle 1 to check the position of the work device 20. The up/down lever 43 is disposed in the rear with respect to the position lever 41 and the sensitivity adjustment lever 42. Therefore, compared with the case in which the up/down lever 43 is disposed in front of the position lever 41 and the sensitivity adjustment lever 42, during the checking of the position of the work device 20, the up/down lever is easily viewable, and gripping of the third grip part 43g of the up/down lever 43 is facilitated. By virtue of this, the worker is able to easily operate the up/down lever 43 in response to the actual position of the work device 20, and operability of the operation lever can be improved.

Also, in the present preferred embodiment, the operation device 40 includes the roller portion 481 and the contact member 482. The contact member 482 moves in the front-rear direction X in response to the movement of the up/down lever 43 in the front-rear direction X. The roller portion 481 is biased toward the contact member 482. The contact member 482 has the contact surface 482S, which moves the work vehicle 1 in the vertical direction Z while relatively moving the roller portion 481 with respect to the contact member 482 in the front-rear direction X. As a result, the roller portion 481 relatively moves with respect to the contact member 482 in the front-rear direction X while the roller portion 481 resists the force, which applies bias when the roller portion 481 is moved in the direction away from the contact member 482 (downward) among the vertical directions Z. Therefore, the worker has to apply force to the up/down lever 43 in order to move the roller portion 481 in the front-rear direction X. Even if the worker unintentionally hits the up/down lever 43, the changing to the working state or the non-working state does not easily occur.

Also, in the present preferred embodiment, the contact surface 482S includes a portion projecting toward the roller portion 481 in the vertical direction Z and includes portions recessed toward the roller portion 481 in both sides of the projecting portion in the front-rear direction X. As a result, in both of the changing from the working state to the non-working state and the changing from the non-working state to the working state, the roller portion 481 moves over the projecting portion of the contact surface 482S, in other words, the apex of the projecting portion 482C. The roller portion 481 is biased toward the contact member 482. Therefore, in order to cause the roller portion 481 to move over the apex of the projecting portion 482C, the worker has to apply force to the up/down lever 43. Even if the worker unintentionally hits the up/down lever 43, the changing to the working state or the non-working state does not easily occur.

In the present preferred embodiment, the up/down lever 43 may be disposed in the inner side in the width direction Y with respect to the rollover protective frame 7. By virtue of this, even if the work vehicle 1 rolls over, tilting of the up/down lever 43 toward the driver seat 4S can be restricted by the rollover protective frame 7.

Also, the up/down guide plate 452 includes an up/down guide hole 452h in which the up/down lever 43 is inserted. The up/down guide hole 452h may include the first hole portion 452h1 and the second hole portion 452h2. By virtue of this, the worker can maintain the non-working state only by moving the up/down lever 43 in the width direction Y after changing to the non-working state. Even if the worker unintentionally hits the up/down lever 43, the changing from the non-working state to the working state does not easily occur, and the changing to the working state in a non-working region can be restricted.

Also, in the present preferred embodiment, the operation device 40 is provided with the biasing member 47 which biases the up/down lever 43, which is positioned in the second hole portion 452h2, toward the outside in the width direction Y. Even if the worker unintentionally hits the up/down lever 43, the changing from the non-working state to the working state does not easily occur further. Also, the worker can more easily move the up/down lever 43 when the worker moves the up/down lever 43 from a position distant from his/her body to a position near his/her body than when the worker moves the up/down lever 43 from the position near his/her body to the position distant from his/her body. Therefore, when the up/down lever 43 is to be moved against the biasing force of the biasing member 47, a load on the worker can be reduced by moving the up/down lever 43 from the position distant from his/her body to the position near his/her body.

Also, in the present preferred embodiment, the operation device 40 is provided with the biasing member 47 which biases the up/down lever 43, which is positioned in the third hole portion 452h3, toward the outside in the width direction Y. Even if the worker unintentionally hits the up/down lever 43, the changing from the working state to the non-working state does not easily occur further. Also, the worker can more easily move the up/down lever 43 when the worker moves the up/down lever 43 from a position distant from his/her body to a position near his/her body than when the worker moves the up/down lever 43 from the position near his/her body to the position distant from his/her body. Therefore, when the up/down lever 43 is to be moved against the biasing force of the biasing member 47, a load on the worker can be reduced by moving the up/down lever 43 from the position distant from his/her body to the position near his/her body.

Note that, in the present preferred embodiment, the operation device 40 is provided with the restriction mechanism 48. Therefore, even without a later-described restriction member 49, the changing between the working state and the non-working state is restricted. Since manual operation of the restriction member 49 is not required, operability of the worker can be improved while the changing between the working state and the non-working state which is not intended by the worker is restricted.

Also, in the present preferred embodiment, the first hole portion 452h1 is extending along the front-rear direction X, in other words, in parallel to the front-rear direction X, and each of the second hole portion 452h2 and the third hole portion 452h3 is extending along the width direction Y, in other words, in parallel to the width direction Y. By virtue of this, the worker is not required to finely operate the up/down lever 43 compared with an up/down guide plate 452 according to a later-described modification example. Therefore, operability of the operation lever can be improved.

Modification Example 1

Figure 8:
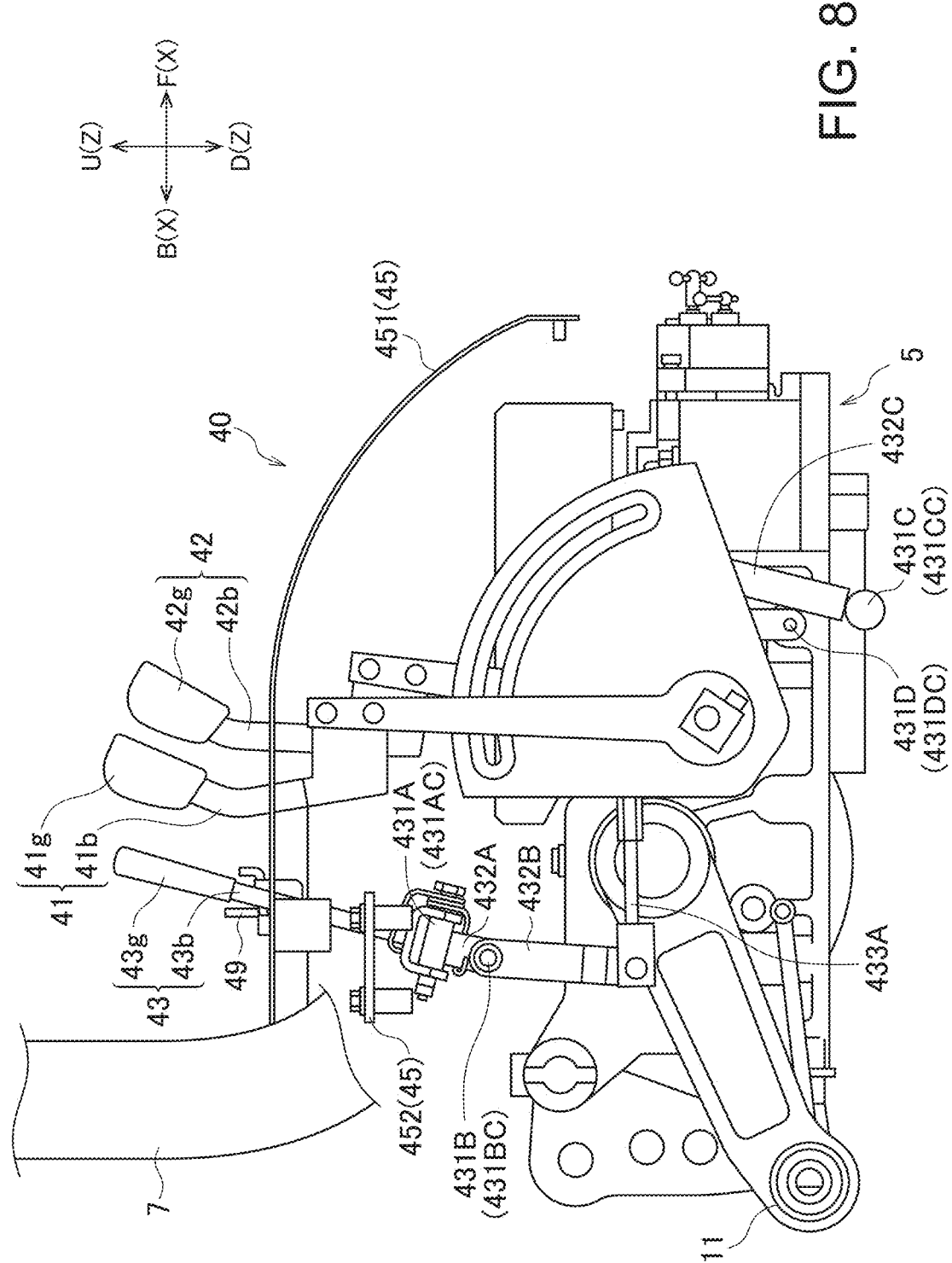
FIG. 8 is a right side view of an operation device according to a Modification Example 1 of a preferred embodiment of the present invention.
Figure 9:
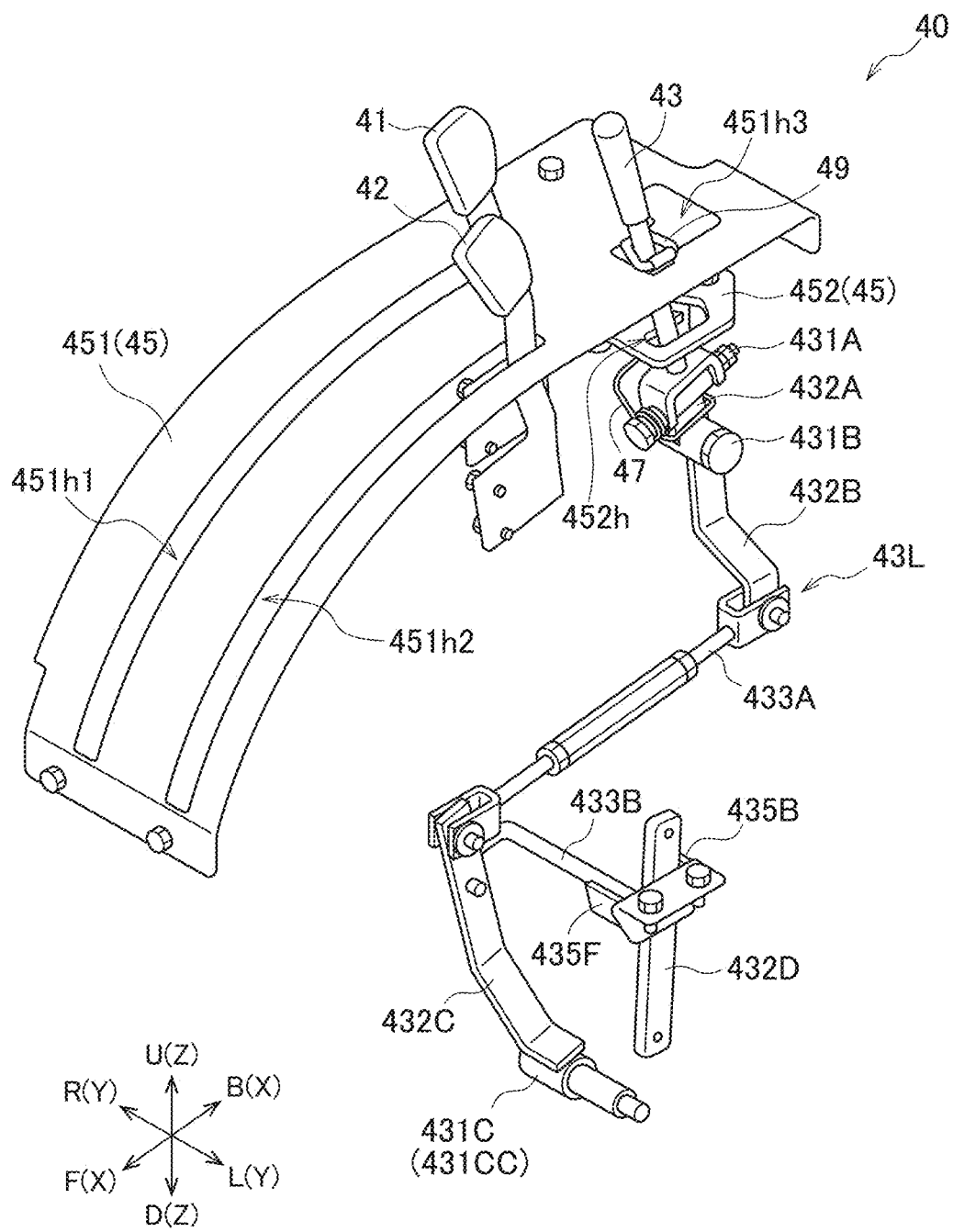
FIG. 9 is a perspective view (number 1) of the operation device according to Modification Example 1 viewed from an upper left front side.
Figure 10:
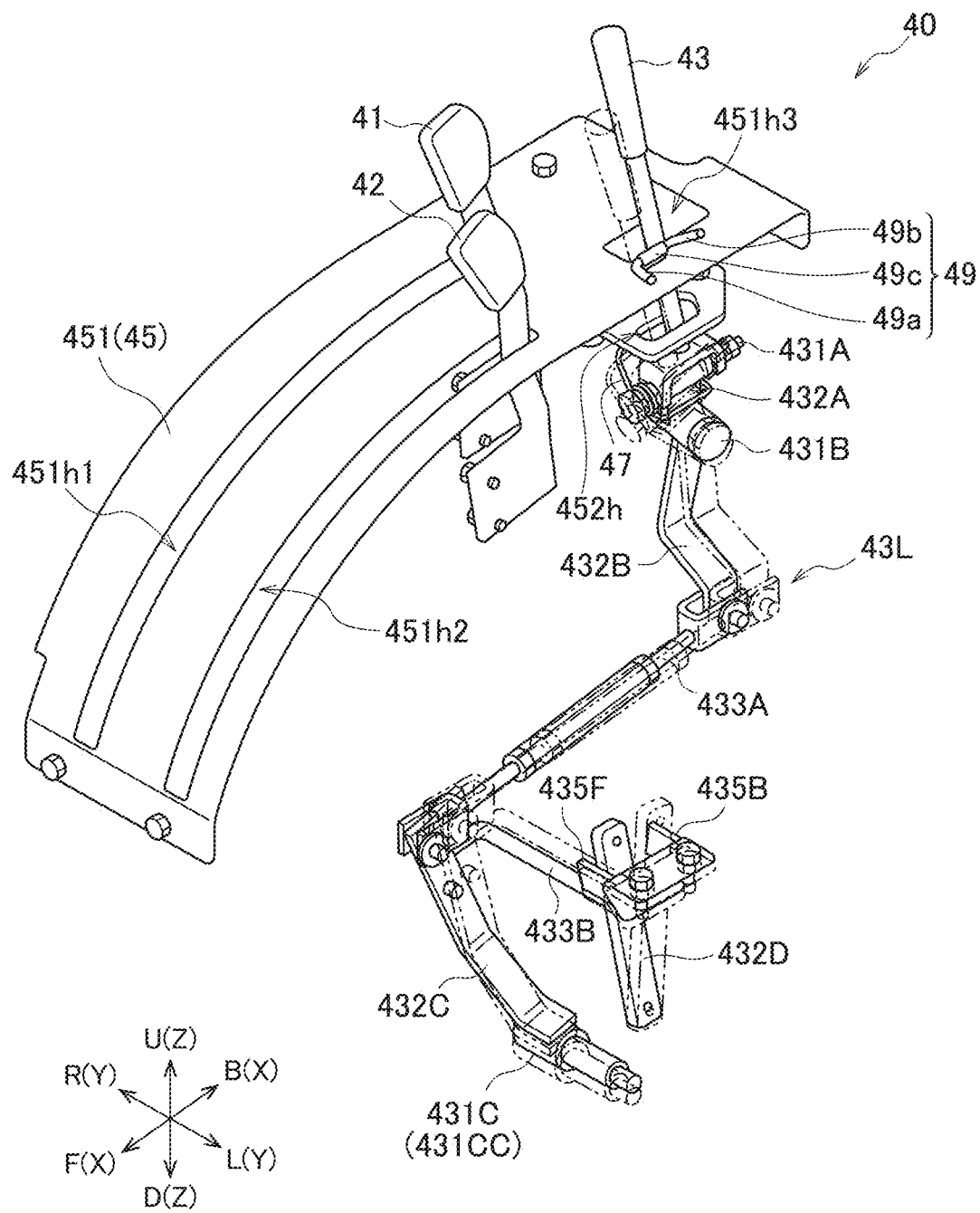
FIG. 10 is a perspective view (number 2) of the operation device according to Modification Example 1 viewed from an upper left front side.
Figure 11:
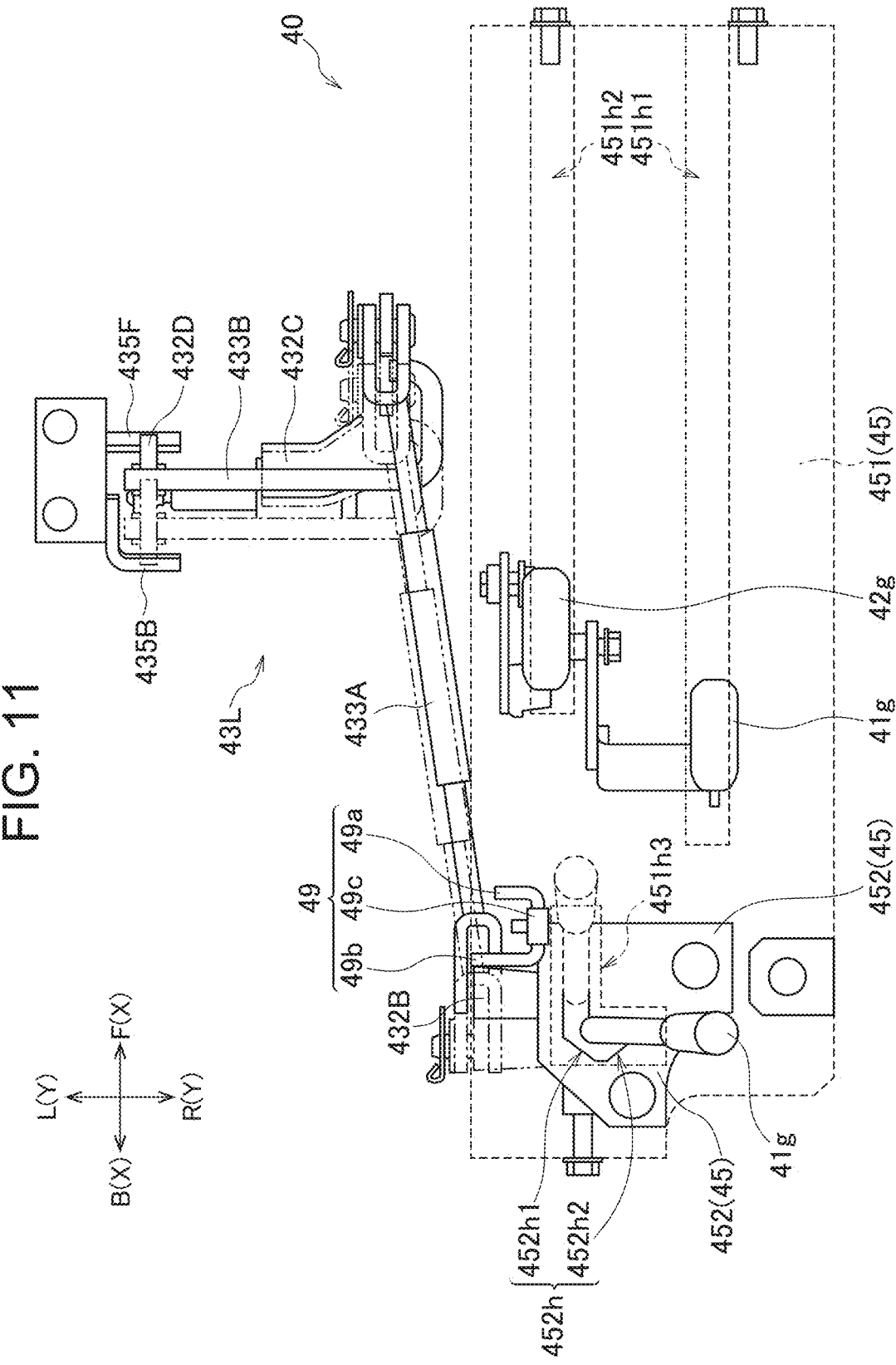
FIG. 11 is a top view of the operation device according to Modification Example 1.
Figure 12:
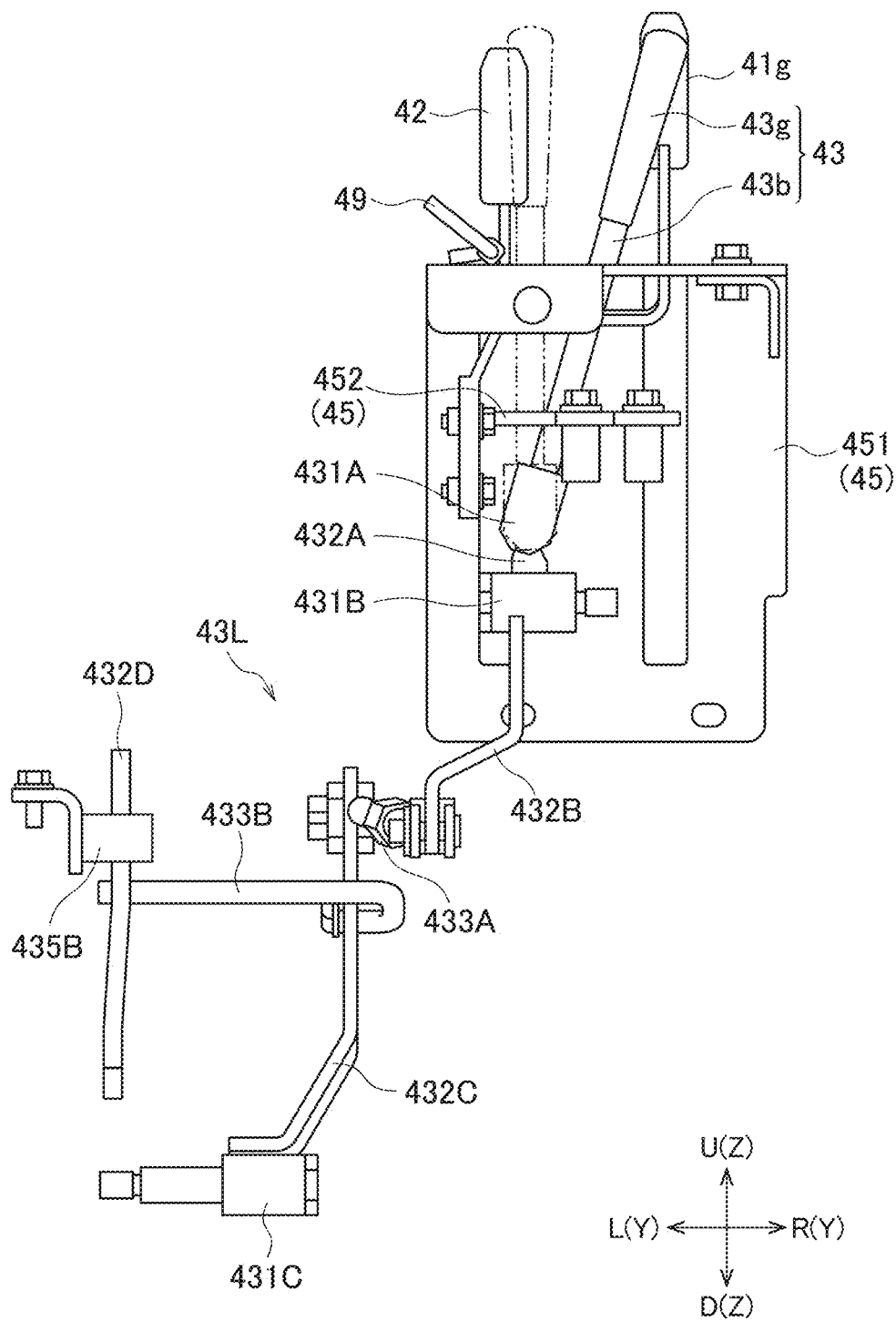
FIG. 12 is a back view of the operation device according to Modification Example 1.
Figure 13A:
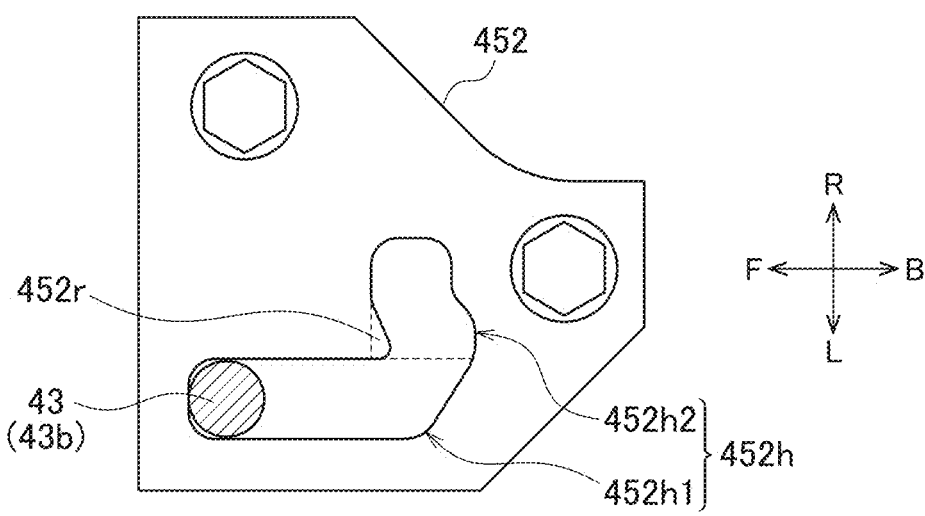
FIGS. 13A and 13B illustrate top views of an up/down guide plate according to Modification Example 1.
Figure 13B:
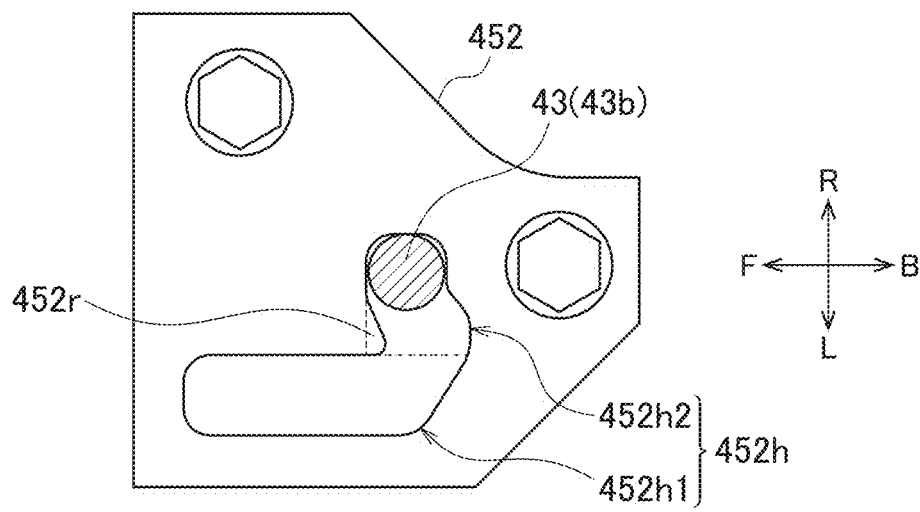

Next, the operation device 40 according to Modification Example 1 of a preferred embodiment of the present invention will be described by using FIG. 8 to FIGS. 13A and 13B. Description of the portions similar to those of the above-described preferred embodiment will be appropriately omitted. Note that FIG. 8 and FIG. 9 illustrate the position of the up/down lever in the working state, and FIG. 10 to FIG. 12 illustrate the position of the up/down lever 43 after the working state is changed to the non-working state. FIG. 13A and FIG. 13B are top views of the up/down guide plate 452. FIG. 13A illustrates the position of the up/down lever 43 in the working state, and FIG. 13B illustrates the position of the up/down lever 43 in the non-working state. It should be noted that, in each diagram, illustration of some members may be omitted for the convenience of explanation.

As illustrated in FIG. 11, etc., the up/down lever 43 is disposed between the position lever 41 and the sensitivity adjustment lever 42 in the width direction Y of the work vehicle 1. An outer edge of the third grip part 43g of the up/down lever 43 may be positioned in the inner side with respect to an outer edge of the first grip part 41g of the position lever 41 in the width direction Y. Also, the outer edge of the third grip part 43g of the up/down lever 43 may be positioned outside with respect to an inner edge of the second grip part 42g of the sensitivity adjustment lever 42 in the width direction Y. Also, an outer edge of the third guide hole 451h3, in which the up/down lever 43 is inserted, may be positioned in the inner side with respect to an outer edge of the first guide hole 451h1, in which the position lever 41 is inserted, in the width direction Y. An inner edge of the third guide hole 451h3 may be positioned outside with respect to an inner edge of the second guide hole 451h2, in which the sensitivity adjustment lever 42 is inserted, in the width direction Y. Also, an outer edge of the up/down guide hole 452h may be positioned in the inner side with respect to the outer edge of the first guide hole 451h1 in the width direction Y, and an inner edge of the up/down guide hole 452h may be positioned outside with respect to the inner edge of the second guide hole 451h2 in the width direction Y.

The up/down lever 43 is disposed between the position lever 41 and the sensitivity adjustment lever 42 in the width direction Y of the work vehicle 1. By virtue of this, operation of the up/down lever 43 after operating the position lever 41 and the sensitivity adjustment lever 42 can be facilitated. Similarly, operation of the position lever 41 and the sensitivity adjustment lever 42 after operating the up/down lever 43 can be facilitated. As a result, operability of the worker can be improved.

As illustrated in FIGS. 13A and 13B, the up/down guide hole 452h may include the first hole portion 452h1, which is extending in the front-rear direction X, and the second hole portion 452h2, which is extending from the rear end portion of the first hole portion 452h1 toward outside in the width direction Y. The up/down guide plate 452 may include a rear protrusion portion 452r, which is extending rearward toward the up/down guide hole 452h. The rear protrusion portion

452*r* may be adjacent to the first hole portion 452*h*1 outside of the first hole portion 452*h*1 in the width direction Y and may be positioned in front of the second hole portion 452*h*2. The second hole portion 452*h*2 may extend along the width direction Y from outside with respect to the rear protrusion portion 452*r* in the width direction Y. The rear protrusion portion 452*r* may have a circular arc shape. Note that the up/down guide hole 452*h* is not required to have the third hole portion 452*h*3, which extends in the width direction Y of the work vehicle 1 from the front end portion of the first hole portion 452*h*1 in the front-rear direction X.

The up/down guide plate 452 includes the rear protrusion portion 452*r*. Therefore, even if the worker unintentionally hits the up/down lever 43 when the up/down lever 43 is present at the position of the non-working state as illustrated in FIG. 13B, the rear protrusion portion 452*r* makes it difficult to move the up/down lever 43 toward the inner side (leftward direction L) in the width direction Y, and the changing to the working state which is not intended by the worker does not easily occur.

Also, the operation device 40 may be provided with the restriction member 49, which restricts movement of the up/down lever 43 to maintain the working state. As illustrated in FIG. 11, etc., the restriction member 49 includes a front end portion 49A extending in the width direction Y, a rear end portion 49B extending in the width direction Y, and a main-body portion 49C mutually connecting the front end portion 49A and the rear end portion 49B. The restriction member 49 can turn about the shaft center of the main-body portion 49C. If the up/down guide hole 452*h* does not have the third hole portion 452*h*3, the operation device 40 may be provided with the restriction member 49.

Since the restriction member 49 is disposed so that the rear end portion 49B is positioned in the rear of the up/down lever 43, the up/down lever 43 is prevented by the rear end portion 49B from being positioned in the rear. As a result, changing from the working state to the non-working state is disabled. By virtue of this, even if the worker unintentionally hits the up/down lever 43, the changing from the working state to the non-working state does not easily occur. On the other hand, as illustrated in FIG. 11, etc., when the restriction member 49 is turned toward the inner side in the width direction Y, the rear end portion 49B is not positioned in the rear of the up/down lever 43. As a result, the changing from the working state to the non-working state is enabled.

Note that the operation device 40 according to Modification Example 1 is not required to be provided with the restriction mechanism 48. By virtue of this, the number of members can be reduced, and an increase in manufacturing cost can be restricted.

Modification Example 2

Figure 14A:
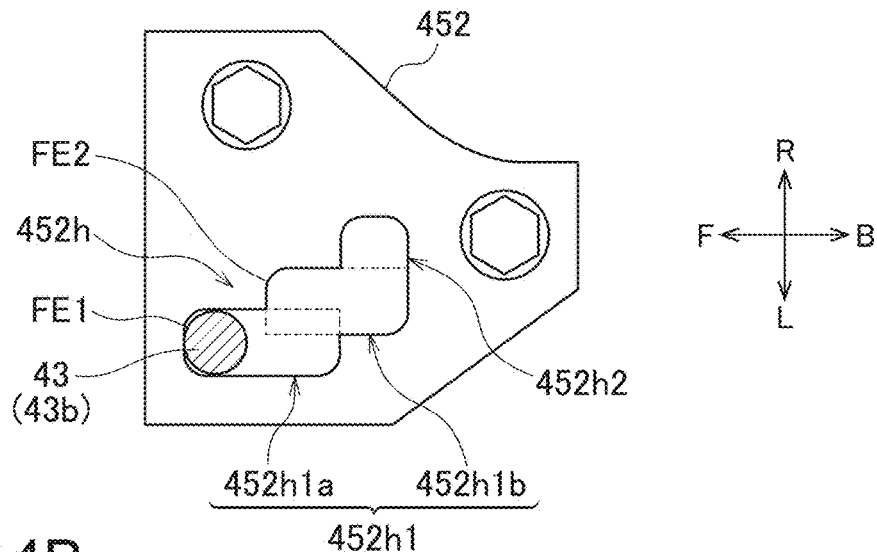
FIGS. 14A to 14C illustrate top views of an up/down guide plate according to Modification Example 2 of a preferred embodiment of the present invention.
Figure 14B:
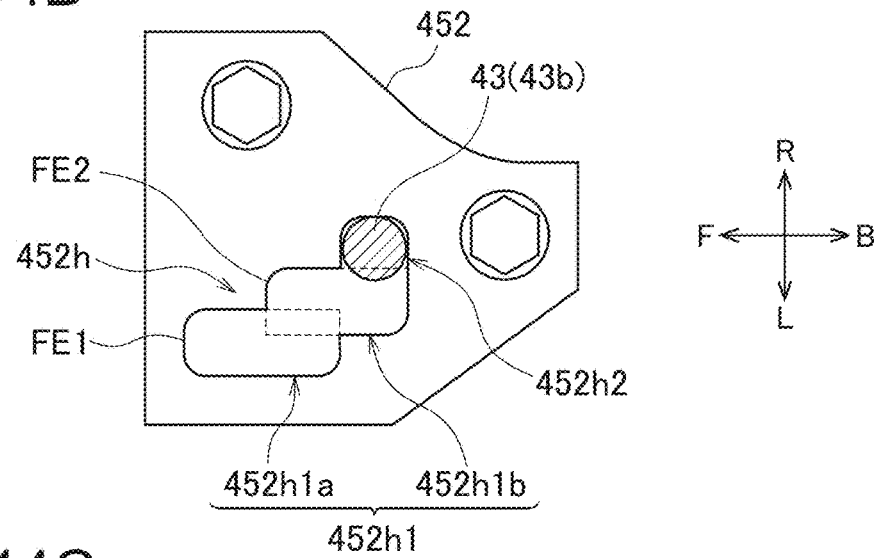
Figure 14C:
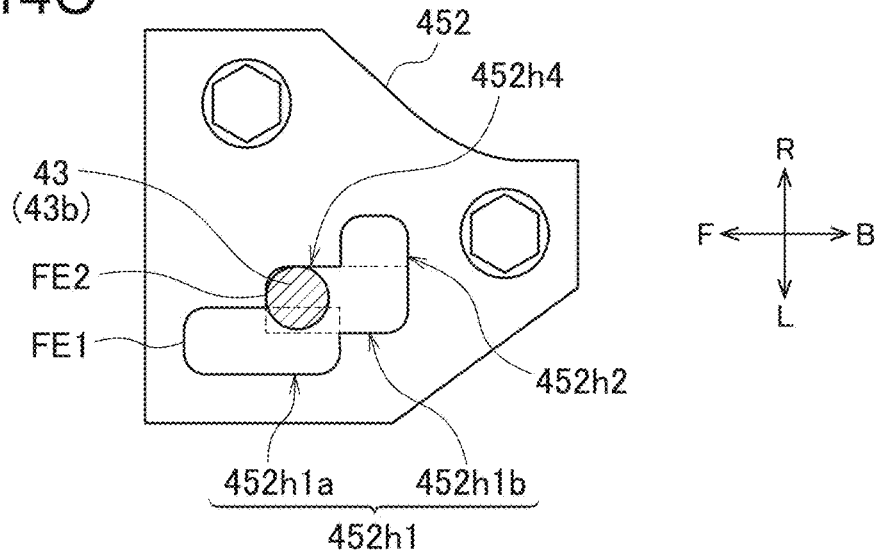

Next, the operation device 40 according to Modification Example 2 of a preferred embodiment of the present invention will be described by using FIGS. 14A to 14C. Description of the portions similar to those of the above-described preferred embodiment and Modification Example 1 will be appropriately omitted. Note that FIGS. 14A to 14C are top views of the up/down guide plate 452. FIG. 14A illustrates the position of the up/down lever 43 in the working state, and FIG. 14B and FIG. 14C illustrate the position of the up/down lever 43 in the non-working state. It should be noted that, in each diagram, illustration of some members may be omitted for the convenience of explanation.

In the operation device 40 according to Modification Example 2, the up/down guide plate 452 includes the first hole portion 452*h*1, which is extending in the front-rear direction X and the second hole portion 452*h*2, which is extending toward outside in the width direction Y from the rear end portion of the first hole portion 452*h*1. The first hole portion 452*h*1 includes a front first hole portion 452*h*1*a* and an adjacent first hole portion 452*h*1*b*. The front first hole portion 452*h*1*a* is positioned in front of the adjacent first hole portion 452*h*1*b*. Therefore, a front edge FE1 of the front first hole portion 452*h*1*a* is positioned in front of the front edge FE2 of the adjacent first hole portion 452*h*1*b*. The adjacent first hole portion 452*h*1*b* is positioned outside (rightward direction R) in the width direction Y with respect to the front first hole portion 452*h*1*a* and is overlapped with a portion of the front first hole portion 452*h*1*a*. The second hole portion 452*h*2 is extending toward outside in the width direction Y from the rear end portion of the adjacent first hole portion 452*h*1*b*.

As illustrated in FIG. 14A, the state in which the up/down lever 43 is in contact with the front edge FE1 of the front first hole portion 452*h*1*a* is the working state. As illustrated in FIG. 14B, the state in which at least a portion of the up/down lever 43 is positioned in the second hole portion 452*h*2 is the non-working state. As illustrated in FIG. 14C, the state in which the up/down lever 43 is in contact with the front edge FE2 of the adjacent first hole portion 452*h*1*b* is the non-working state. By virtue of this, even if the worker unintentionally hits the up/down lever 43 in the state in which at least a portion of the up/down lever 43 is positioned in the second hole portion 452*h*2 (see FIG. 14B) and moves the up/down lever 43 to the first hole portion 452*h*1, the up/down lever 43 contacts the front edge FE2 of the adjacent first hole portion 452*h*1*b*, and movement of the up/down lever 43 is stopped (see FIG. 14C). By virtue of this, even if the worker unintentionally hits the up/down lever 43, the changing to the non-working state does not easily occur.

Other Preferred Embodiments

Although the present invention has been described in detail with reference to the preferred embodiments described above and modification examples thereof, it will be apparent to those skilled in the art that the present invention is not limited to the preferred embodiments and modification examples described herein. The present invention may be practiced as modifications and variations without departing from the spirit and scope of the present invention as defined by the claims. Accordingly, the description herein is intended to be illustrative and has no restrictive meaning with respect to the present invention.

In the above-described preferred embodiments, the roller portion 481 may be fixed to the second arm 432B directly or indirectly via another member, and the contact member 482 may be fixed to the swing member 483. In such a case, the roller portion 481 moves in the front-rear direction X in response to the movement of the up/down lever 43 in the front-rear direction X. Also, the contact member 482 is biased toward the roller portion 481. By virtue of this, the roller portion 481 moves in the vertical direction Z of the work vehicle 1 while relatively moving with respect to the contact member 482 in the front-rear direction X. As a result, the worker has to apply force to the up/down lever 43 in order to move the roller portion 481 in the front-rear direction X. Even if the worker unintentionally hits the up/down lever 43, the switching to the working state or the non-working state does not easily occur.

Also, the center of the contact surface 482S of the contact member 482 in the front-rear direction X may be recessed toward the roller portion 481 in the vertical direction Z, and both sides of the recessed portion in the front-rear direction X may be projecting toward the roller portion 481. The case in which the roller portion 481 contacts the recessed portion of the contact surface 482S may be in the non-working state. In such a case, movement of the roller portion 481 to the recessed portion of the contact surface 482S is facilitated by the biasing member 47. Therefore, changing from the working state to the non-working state can be easily carried out. On the other hand, in order to move the roller portion 481 from the recessed portion of the contact surface 482S to the front side, the up/down lever 43 has to be moved against the biasing force of the biasing member 47. Therefore, even if the worker unintentionally hits the up/down lever 43, the changing from the non-working state to the working state does not easily occur. Also, the front portion of the contact surface 482S may be projecting toward the roller portion 481, and the rear portion of the contact surface 482S may be recessed with respect to the roller portion 481. By virtue of this, the changing from the working state to the non-working state can be easily carried out, while the changing from the non-working state to the working state does not easily occur even if the worker unintentionally hits the up/down lever 43.

In the above-described preferred embodiments, the case in which the work device 20 is a rotary tilling device has been described. However, the work device 20 is not limited thereto. The work device 20 may be a towing-type tilling device (for example, plow).

In such a case, up/down sensitivity corresponding to a variation in towing load may be adjusted by the sensitivity adjustment lever 42. For example, as the sensitivity adjustment lever 42 is swung toward the rear B, the actuation sensitivity with respect to the variation in the towing load detected from the work device 20 becomes sensitive, and the responsiveness of up/down movement of the work device 20 becomes higher. In other words, the up/down movement degree with respect to the variation in the tilling depth increases. On the other hand, as the sensitivity adjustment lever 42 is swung toward the front F, the actuation sensitivity with respect to the variation in the towing load detected from the work device 20 becomes less sensitive, and the responsiveness of up/down movement of the work device 20 becomes lower. In other words, the up/down movement degree with respect to the variation in the tilling depth decreases.

The above-described preferred embodiments and modification examples may be appropriately combined. For example, the up/down guide hole 452*h* according to the preferred embodiments may include the first hole portion 452*h*1 and the second hole portion 452*h*2 only and is not required to have the third hole portion 452*h*3. Also, the operation device 40 according to Modification Example 1 or 2 may include the restriction mechanism 48.

Modification Example 3

Figure 15:
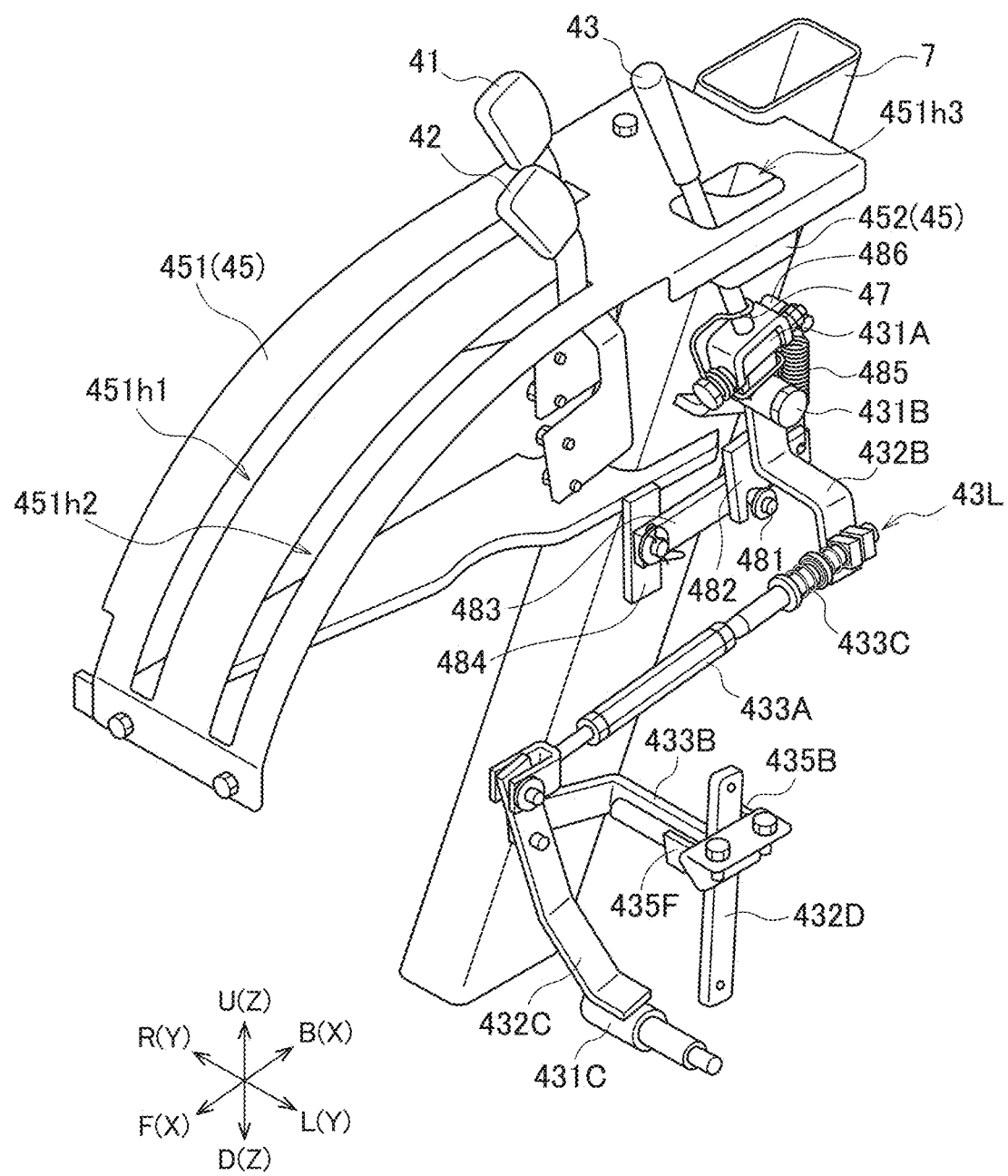
FIG. 15 is a perspective view of an operation device according to Modification Example 3 of a preferred embodiment of the present invention viewed from an upper left front side.

Next, the operation device 40 according to Modification Example 3 of a preferred embodiment of the present invention will be described by using FIG. 15 to FIG. 16. Description of the portions similar to those of the above-described preferred embodiments and Modification Examples 1 and 2 will be appropriately omitted. Note that FIG. 15 is a perspective view illustrating the operation device according to Modification Example 3 from an upper left front side thereof, and FIG. 16 is an explanatory diagram for describing movement of the operation device according to Modification Example 3. It should be noted that, in each diagram, illustration of some members may be omitted for the convenience of explanation.

The operation device 40 according to Modification Example 3 is provided with a biasing member 433C (second biasing member). Specifically, as illustrated in FIG. 15, the biasing member 433C is structured by providing a spring at a portion of the first coupling rod 433A.

Hereinafter, with reference to FIG. 16, effects achieved by the operation device 40 according to Modification Example 3 will be described by taking, as an example, a case in which a neutral position N of a spool of the hydraulic cylinder is in a vicinity of a guide projecting portion 452P in the front-rear direction X.

First, in the non-working state (the state in which at least a portion of the third lever main-body part 43*b* of the up/down lever 43 is positioned in the second hole portion 452*h*2), the worker operates the up/down lever 43 and moves the position of the up/down lever 43 from a position A to a position B illustrated in FIG. 16.

Second, the worker releases his/her hand from the up/down lever 43 after the up/down lever 43 is moved to the position B. As a result, if the biasing member 433C is not provided, the up/down lever 43 is pushed toward the front side F in the front-rear direction X by a feedback mechanism of the hydraulic cylinder (in other words, pushed toward the neutral position N of the spool of the hydraulic cylinder), is biased toward outside (rightward direction R) in the width direction Y by the biasing member 47, and, as a result, is moved from the position B to a position C.

Herein, the feedback mechanism of the hydraulic cylinder is a mechanism provided in a hydraulic cylinder assembly which directly moves the spool of the hydraulic cylinder so as to stop inflow of oil when the hydraulic cylinder reaches a highest position.

As a result of above description, the position of the up/down lever 43 may be shifted from the position intended by the worker. Other than the above-described case, even if the position of the up/down lever 43 is in the second hole portion 452*h*2, depending on the above-described neutral position N, the position of the up/down lever 43 may be shifted toward the front side F or the rear side B in the front-rear direction X, in other words, toward the neutral position N by the force of the feedback mechanism of the hydraulic cylinder.

In order to solve this positional shift of the up/down lever 43, the operation device 40 according to Modification Example 3 is provided with the above-described biasing member 433C.

As described above, the biasing member 433C is structured to bias to the up/down lever 43, which is positioned in the first hole portion 452*h*1, in the direction away from the above-described neutral position N (in other words, in the direction opposite to the above-described neutral position N when viewed from the up/down lever 43) in the front-rear direction X.

For example, if the above-described neutral position N is in the rear side B of the up/down lever 43 in the front-rear direction X, the up/down lever 43 is pushed by the above-described feedback mechanism toward the rear side B in the front-rear direction X. Therefore, the biasing member 433C biases the up/down lever 43 toward the front side F in the front-rear direction X by a reaction force against the pushing force.

As a result of providing the biasing member 433C, in the above-described case, even if the worker releases his/her hand from the up/down lever 43 after the position of the up/down lever 43 is moved to the position B, the pushing force by the feedback mechanism of the hydraulic cylinder toward the front side F in the front-rear direction X (in other words, the pushing force toward the neutral position N of the spool of the hydraulic cylinder) and the biasing force by the biasing member 433C toward the rear side B in the front-rear direction X cancel out each other, and at least a portion of the third lever main-body part 43*b* of the up/down lever 43 is returned to the state in which at least the portion is positioned in the second hole portion 452*h*2 by the force that applies bias by the biasing member 47C toward the outside in the width direction Y. As a result, the situation that the position of the up/down lever 43 is shifted from the position intended by the worker can be avoided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An operation device of a work vehicle, the operation device comprising:
    a position lever to set a height of the work device;
    a sensitivity adjustment lever to adjust an up/down sensitivity of the work device; and
    an up/down lever to selectively change a working state and a non-working state, the working state being a state in which the work device is positioned at the height set by the position lever, the non-working state being a state in which the work device is positioned above the set height; wherein the up/down lever is located rearward of the position lever and the sensitivity adjustment lever;
    the up/down lever is located inside of a rollover protective frame provided to protect a worker if the work vehicle rolls over;
    the working state and the non-working state are mutually changed when the up/down lever moves in a front-rear direction of the work vehicle;
    the working state or the non-working state are maintained when the up/down lever moves in a width direction of the work vehicle; and
    the up/down lever includes:
        a first swing shaft part which serves as a pivot point of swing in the width direction; and
        a second swing shaft part which serves as a pivot point of swing in the front-rear direction.

2. The operation device of the work vehicle according to claim 1, further comprising:
    a roller portion; and
    a contact relatively movable with respect to the roller portion while in contact with the roller portion; wherein
    the working state and the non-working state are mutually changed when the up/down lever moves in the front-rear direction;
    the roller portion or the contact moves in the front-rear direction in response to the movement of the up/down lever in the front-rear direction;
    one of the roller portion and the contact is biased toward the other one of the roller portion and the contact; and
    the contact includes a contact surface to move the roller portion in a vertical direction of the work vehicle while relatively moving the roller portion with respect to the contact in the front-rear direction.

3. The operation device of the work vehicle according to claim 2, wherein
    the contact surface includes:
    a projecting portion that projects toward the roller portion in the vertical direction; and
    portions located on both sides of the projecting portion in the front-rear direction and recessed with respect to the roller portion.

4. The operation device of the work vehicle according to claim 1, wherein
    the operation device further comprises an up/down guide plate including an up/down guide hole in which the up/down lever is inserted to guide the up/down lever;
    the up/down guide hole includes:
    a first hole portion extending in the front-rear direction to guide the movement of the up/down lever in the front-rear direction to change the working state and the non-working state; and
    a second hole portion extending in the width direction from one end portion of the first hole portion in the front-rear direction to guide movement of the up/down lever in the width direction to maintain the non-working state.

5. The operation device of the work vehicle according to claim 4, wherein
    the second hole portion extends toward an outside in the width direction from the one end portion of the first hole portion in the front-rear direction; and
    the operation device further comprises a first biasing member to bias the up/down lever toward the outside in the width direction, the up/down lever being positioned in the second hole portion.

6. The operation device of the work vehicle according to claim 4, wherein
    the up/down guide hole includes a third hole portion extending toward an outside in the width direction of the work vehicle from another end portion of the first hole portion in the front-rear direction to guide the movement of the up/down lever in the width direction for maintaining the working state; and
    the operation device further comprises a first biasing member to bias the up/down lever toward the outside in the width direction, the up/down lever being positioned in the third hole portion.

7. The operation device of the work vehicle according to claim 1, further comprising a restrictor to restrict movement of the up/down lever to maintain the working state.

8. The operation device of the work vehicle according to claim 1, wherein the up/down lever is between the position lever and the sensitivity adjustment lever in the width direction of the work vehicle.

9. The operation device of the work vehicle according to claim 5, further comprising:
    a feedback mechanism of a hydraulic cylinder; and
    a second biasing member to bias the up/down lever in a direction away from a neutral position of a spool of the hydraulic cylinder in the front-rear direction, the up/down lever being positioned in the first hole portion.

* * * * *